US010764913B2

(12) United States Patent
Yerramalli et al.

(10) Patent No.: US 10,764,913 B2
(45) Date of Patent: Sep. 1, 2020

(54) TECHNIQUES FOR ASSISTING PERFORMANCE OF LISTEN BEFORE TALK PROCEDURES AND UPLINK TRAFFIC MULTIPLEXING AT USER EQUIPMENT

(71) Applicant: QUALCOMM Incorporated, San Diego, CA (US)

(72) Inventors: Srinivas Yerramalli, San Diego, CA (US); Aleksandar Damnjanovic, Del Mar, CA (US); Peter Gaal, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 171 days.

(21) Appl. No.: 15/467,379

(22) Filed: Mar. 23, 2017

(65) Prior Publication Data
US 2017/0280475 A1 Sep. 28, 2017

Related U.S. Application Data

(60) Provisional application No. 62/312,862, filed on Mar. 24, 2016.

(51) Int. Cl.
*H04W 72/12* (2009.01)
*H04W 74/08* (2009.01)
(Continued)

(52) U.S. Cl.
CPC ....... *H04W 72/1268* (2013.01); *H04W 16/14* (2013.01); *H04W 28/0278* (2013.01);
(Continued)

(58) Field of Classification Search
CPC . H04W 72/048; H04W 76/043; H04W 8/005; H04W 92/18; H04W 92/16;
(Continued)

(56) References Cited

U.S. PATENT DOCUMENTS

2015/0148053 A1* 5/2015 Patel ................. H04W 72/0426
455/452.1
2016/0135189 A1* 5/2016 Chandrasekhar ..........................
H04W 72/0453
370/329

(Continued)

OTHER PUBLICATIONS

ISA/EP, International Search Report and Written Opinion of the International Searching Authority, Int'l Application No. PCT/US2017/023943, dated Aug. 24, 2017, European Patent Office, Rijswijk, NL, 19 pgs.

(Continued)

*Primary Examiner* — Kwang B Yao
*Assistant Examiner* — Syed M Bokhari
(74) *Attorney, Agent, or Firm* — QUALCOMM Incorporated

(57) ABSTRACT

Techniques are described for wireless communication. One method for wireless communication at a user equipment (UE) includes receiving, over the air, information indicative of at least one type of LBT procedure to perform for an uplink transmission; identifying, from the received information, the at least one type of LBT procedure to perform for the uplink transmission; and performing, for a shared spectrum, the at least one type of LBT procedure for the uplink transmission. One method for wireless communication at a network access device includes scheduling an uplink transmission of a UE in a shared spectrum, and transmitting, over the air, information indicative of at least one type of LBT procedure to perform for the uplink transmission.

76 Claims, 24 Drawing Sheets

(51) Int. Cl.
*H04W 76/27* (2018.01)
*H04W 16/14* (2009.01)
*H04W 28/02* (2009.01)
*H04W 72/10* (2009.01)
*H04W 72/14* (2009.01)
*H04W 88/02* (2009.01)

(52) U.S. Cl.
CPC .......... *H04W 72/10* (2013.01); *H04W 72/14* (2013.01); *H04W 74/0808* (2013.01); *H04W 76/27* (2018.02); *H04Q 2213/13215* (2013.01); *H04W 88/02* (2013.01)

(58) Field of Classification Search
CPC ... H04W 72/042; H04W 84/18; H04W 72/00; H04W 72/1268; H04W 76/00; H04W 74/0808; H04W 16/14; H04W 72/10; H04W 72/14; H04W 28/0278; H04W 88/02; H04Q 2213/13215
USPC .................................................. 370/329, 310
See application file for complete search history.

(56) References Cited

U.S. PATENT DOCUMENTS

| | | | | |
|---|---|---|---|---|
| 2016/0278048 | A1* | 9/2016 | Nory | H04W 74/006 |
| 2017/0019909 | A1* | 1/2017 | Si | H04L 47/27 |
| 2017/0041805 | A1* | 2/2017 | Chandrasekhar | H04W 74/0816 |
| 2017/0222749 | A1* | 8/2017 | Dinan | H04L 1/0023 |
| 2017/0238342 | A1* | 8/2017 | Yang | H04W 76/10 370/329 |
| 2017/0257842 | A1* | 9/2017 | Hessler | H04W 68/02 |
| 2017/0318607 | A1* | 11/2017 | Tiirola | H04W 74/0808 |
| 2017/0339717 | A1* | 11/2017 | Futaki | H04W 16/14 |
| 2019/0053276 | A1* | 2/2019 | Karaki | H04W 16/14 |

OTHER PUBLICATIONS

LG Electronics, "LBT Schemes in LAA UL," 3GPP TSG RAN WG1 Meeting #84, R1-160630, St. Julian's, Malta, Feb. 15-19, 2016, 10 pgs., XP051053959, 3rd Generation Partnership Project.

NTT Docomo, Inc., "Discussion on UL Scheduling Design for eLAA," 3GPP TSG RAN WG1 Meeting #84, R1-160947, St. Julian's, Malta, Feb. 15-19, 2016, 5 pgs., XP051054255, 3rd Generation Partnership Project.

ISA/EPO, Partial International Search Report of the International Searching Authority, Int'l. App. No. PCT/US2017/023943, dated Jul. 3, 2017, European Patent Office, Rijswijk, NL, 14 pgs.

ZTE, "UL Framework for LAA," 3GPP TSG RAN WG1 Meeting #82bis, R1-155245, Malmo, Sweden, Oct. 5-9, 2015, 6 pgs., XP051002210, 3rd Generation Partnership Project.

\* cited by examiner

TECHNIQUES FOR ASSISTING PERFORMANCE OF LISTEN BEFORE TALK PROCEDURES AND UPLINK TRAFFIC MULTIPLEXING AT USER EQUIPMENT

CROSS REFERENCES

The present application for patent claims priority to U.S. Provisional Patent Application No. 62/312,862 by Yerramalli, et al., entitled "Techniques For Assisting Performance of Listen Before Talk Procedures and Uplink Traffic Mulitplexing at User Equipment," filed Mar. 24, 2016, assigned to the assignee hereof.

BACKGROUND

Field of the Disclosure

The present disclosure, for example, relates to wireless communication systems, and more particularly to techniques for assisting performance of Listen Before Talk (LBT) procedures and uplink traffic multiplexing at user equipment (UEs).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared spectrum, or over different spectrums (e.g., a licensed spectrum and a shared spectrum). With increasing data traffic in cellular networks that use a licensed spectrum, offloading of at least some data traffic to a shared spectrum may provide a mobile network operator (or cellular operator) with opportunities for enhanced data transmission capacity. Shared spectrum may also provide service in areas where access to a licensed spectrum is unavailable. Before communicating over a shared spectrum, a transmitting apparatus may perform a Listen Before Talk (LBT) procedure to contend for access to the shared spectrum.

SUMMARY

An uplink transmission in a shared spectrum may depend on various factors and parameters, such as a network access device (e.g., a base station) winning contention for access to the shared spectrum for a transmission opportunity in which part or all of the uplink transmission occurs, or a UE winning contention for access to the shared spectrum for the uplink transmission, or a priority class of one or more types of traffic included in the uplink transmission (e.g., audio, video, a data file, real-time or streaming data, etc.), or a type or types of LBT procedure to be performed for the transmission opportunity or the uplink transmission, etc. The present disclosure describes techniques for assisting UEs with the performance of LBT procedures, and for assisting UEs with uplink traffic multiplexing (e.g., the transmission of traffic associated with one or more priority classes during one or more uplink transmissions).

In one example, a method for wireless communication at a user equipment (UE) is described. The method may include receiving, over the air, information indicative of at least one type of LBT procedure to perform for an uplink transmission; identifying, from the received information, the at least one type of LBT procedure to perform for the uplink transmission; and performing, for a shared spectrum, the at least one type of LBT procedure for the uplink transmission.

In some examples of the method, the information indicative of the at least one type of LBT procedure to perform for the uplink transmission may indicate at least one of: whether a duration of the uplink transmission is within a maximum channel occupancy time for which the shared spectrum is reserved by a network access device, or a type of LBT procedure to perform prior to transmitting the uplink transmission, or a combination thereof. In some examples, the method may include receiving an uplink grant for the uplink transmission, and the information indicative of the at least one type of LBT procedure to perform for the uplink transmission may include at least one bit received in the uplink grant. In some examples, the information indicative of the at least one type of LBT procedure to perform for the uplink transmission may indicate a duration of a portion of a maximum channel occupancy time for which the shared spectrum is reserved by a network access device and available for uplink transmissions. In some examples, the method may include receiving a common physical downlink control channel (PDCCH), and the information indicative of the at least one type of LBT procedure to perform for the uplink transmission may be signaled in the common PDCCH. In some examples, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

In some examples, the method may include receiving at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the method may include receiving an uplink grant for the uplink transmission, and the at least one indication of the at least one LBT priority class may be received in the uplink grant. In some examples, the uplink grant may further include the information indicative of the at least one type of LBT procedure to perform for the uplink transmission. In some examples, the method may include determining whether the network access device successfully contended for access to the shared spectrum; and determining whether to perform a LBT procedure for the uplink transmission based at least in part on the first LBT priority class or the second LBT priority class, based at least in part on determining whether the network access device successfully contended for access to the shared spectrum. In some examples, the method may include identifying a LBT priority class in the at least one LBT priority class for performing a LBT procedure for the uplink transmission; selecting data for transmission during the uplink transmission based at least in part on the identified LBT priority class; and transmitting the selected data during the uplink transmission.

In some examples, the method may include receiving at least one indication of a contention window size to use for at least one LBT priority class; selecting a LBT priority class for performing a LBT procedure for the shared spectrum; and sizing a contention window for the LBT procedure based at least in part on an indication of a contention window size corresponding to the selected LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of a contention window size for a LBT priority class and a default contention window size. In some examples, the method may include receiving an uplink grant for the uplink transmission, and the at least one indication of a contention window size to use for at least one LBT priority class may be received in the uplink grant.

In some examples of the method, the information indicative of at least one type of LBT procedure to perform for the uplink transmission may include an indication of a type of multi-carrier LBT procedure to perform for the uplink transmission. In some examples, the type of multi-carrier LBT procedure to perform may include: a type of LBT procedure performed for a UE-selected primary carrier in the shared spectrum, or a type of LBT procedure performed for a physical uplink control channel (PUCCH) carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. In some examples, the indication of the type of multi-carrier LBT procedure to perform may be received in radio resource control (RRC) signaling.

In one example, an apparatus for wireless communication at a UE is described. The apparatus may include means for receiving, over the air, information indicative of at least one type of LBT procedure to perform for an uplink transmission; means for identifying, from the received information, the at least one type of LBT procedure to perform for the uplink transmission; and means for performing, for a shared spectrum, the at least one type of LBT procedure for the uplink transmission.

In some examples of the apparatus, the information indicative of the at least one type of LBT procedure to perform for the uplink transmission may indicate at least one of: whether a duration of the uplink transmission is within a maximum channel occupancy time for which the shared spectrum is reserved by a network access device, or a type of LBT procedure to perform prior to transmitting the uplink transmission, or a combination thereof. In some examples, the apparatus may include means for receiving an uplink grant for the uplink transmission, and the information indicative of the at least one type of LBT procedure to perform for the uplink transmission may include at least one bit received in the uplink grant. In some examples, the information indicative of the at least one type of LBT procedure to perform for the uplink transmission may indicate a duration of a portion of a maximum channel occupancy time for which the shared spectrum is reserved by a network access device and available for uplink transmissions. In some examples, the apparatus may include means for receiving a common PDCCH, and the information indicative of the at least one type of LBT procedure to perform for the uplink transmission may be signaled in the common PDCCH. In some examples, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

In some examples, the apparatus may include means for receiving at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the apparatus may include means for receiving an uplink grant for the uplink transmission, and the at least one indication of the at least one LBT priority class may be received in the uplink grant. In some examples, the uplink grant may further include the information indicative of the at least one type of LBT procedure to perform for the uplink transmission. In some examples, the apparatus may include means for determining whether the network access device successfully contended for access to the shared spectrum; and means for determining whether to perform a LBT procedure for the uplink transmission based at least in part on the first LBT priority class or the second LBT priority class, based at least in part on determining whether the network access device successfully contended for access to the shared spectrum. In some examples, the apparatus may include means for identifying a LBT priority class in the at least one LBT priority class for performing a LBT procedure for the uplink transmission; means for selecting data for transmission during the uplink transmission based at least in part on the identified LBT priority class; and means for transmitting the selected data during the uplink transmission.

In some examples, the apparatus may include means for receiving at least one indication of a contention window size to use for at least one LBT priority class; means for selecting a LBT priority class for performing a LBT procedure for the shared spectrum; and means for sizing a contention window for the LBT procedure based at least in part on an indication of a contention window size corresponding to the selected LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of a contention window size for a LBT priority class and a default contention window size. In some examples, the apparatus may include means for receiving an uplink grant for the uplink transmission, and the at least one indication of a contention window size to use for at least one LBT priority class may be received in the uplink grant.

In some examples, the information indicative of at least one type of LBT procedure to perform for the uplink transmission may include an indication of a type of multi-carrier LBT procedure to perform for the uplink transmission. In some examples, the type of multi-carrier LBT procedure to perform may include: a type of LBT procedure performed for a UE-selected primary carrier in the shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. In some examples, the indication of the type of multi-carrier LBT procedure to perform may be received in RRC signaling.

In one example, another apparatus for wireless communication at a UE is described. The apparatus may include a processor, and memory coupled to the processor. The processor may be configured to receive, over the air, information indicative of at least one type of LBT procedure to perform for an uplink transmission; to identify, from the received information, the at least one type of LBT procedure to perform for the uplink transmission; and to perform, for a shared spectrum, the at least one type of LBT procedure for the uplink transmission.

In one example, a computer-readable medium for storing instructions executable by a processor of a UE is described. The instructions may include instructions to receive, over the air, information indicative of at least one type of LBT procedure to perform for an uplink transmission; instructions to identify, from the received information, the at least one type of LBT procedure to perform for the uplink transmission; and instructions to perform, for a shared spectrum, the at least one type of LBT procedure for the uplink transmission.

In one example, a method for wireless communication at a network access device is described. The method may include scheduling an uplink transmission of a UE in a shared spectrum, and transmitting, over the air, information indicative of at least one type of LBT procedure to perform for the uplink transmission.

In some examples of the method, the information indicative of the at least one type of LBT procedure to perform for the uplink transmission may indicate at least one of: whether a duration of the uplink transmission is within a maximum channel occupancy time for which the shared spectrum is reserved by the network access device, or a type of LBT procedure to perform prior to transmitting the uplink transmission, or a combination thereof. In some examples, the method may include transmitting an uplink grant to the UE for the uplink transmission, and the information indicative of the at least one type of LBT procedure to perform for the uplink transmission may include at least one bit in the uplink grant. In some examples, the information indicative of the at least one type of LBT procedure to perform for the uplink transmission may indicate a duration of a portion of a maximum channel occupancy time for which the shared spectrum is reserved by the network access device and available for uplink transmissions. In some examples, the method may include transmitting a common PDCCH; and signaling the information indicative of the at least one type of LBT procedure to perform for the uplink transmission in the common PDCCH. In some examples, the method may include transmitting at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the method may include transmitting an uplink grant for the uplink transmission to the UE, and the at least one indication of the at least one LBT priority class may be transmitted in the uplink grant. In some examples, the uplink grant may further include the information indicative of the at least one type of LBT procedure to perform for the uplink transmission.

In some examples, the method may include transmitting at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of contention window size for a LBT priority class and a default contention window size. In some examples, the method may include transmitting an uplink grant for the uplink transmission, and the at least one indication of a contention window size to use for at least one LBT priority class may be signaled in the uplink grant. In some examples, the method may include detecting receipt of the uplink transmission; failing to decode a cyclic redundancy check (CRC) for the uplink transmission; and updating, based at least in part on failing to decode the CRC for the uplink transmission, a contention window size for a next LBT procedure to contend for access to the shared spectrum. In some examples, the uplink transmission may include a multiple-transmission time interval (TTI) uplink transmission, and the method may further include transmitting a multiple-TTI uplink grant for the multiple-TTI uplink transmission; detecting receipt of the multiple-TTI uplink transmission during at least one TTI of the multiple-TTI uplink transmission; and refraining from updating a contention window size for a next LBT procedure to contend for access to the shared spectrum based at least in part on detecting receipt of the multiple-TTI uplink transmission during the at least one TTI of the multiple-TTI uplink transmission. In some examples, the refraining from updating the contention window size for the next LBT procedure may be further based at least in part on not detecting a LBT gap on the shared spectrum during the multiple TTIs of the multiple-TTI uplink transmission.

In some examples, the method may include transmitting an indication of a type of multi-carrier LBT procedure to perform for the uplink transmission. In some examples, the type of multi-carrier LBT procedure to perform may include: a type of LBT procedure performed for a UE-selected primary carrier in the shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. In some examples, the indication of the type of multi-carrier LBT procedure to perform is transmitted in radio resource control (RRC) signaling.

In one example, an apparatus for wireless communication at a network access device is described. The apparatus may include means for scheduling an uplink transmission of a UE in a shared spectrum, and means for transmitting, over the air, information indicative of at least one type of LBT procedure to perform for the uplink transmission.

In some examples of the apparatus, the information indicative of the at least one type of LBT procedure to perform for the uplink transmission may indicate at least one of: whether a duration of the uplink transmission is within a maximum channel occupancy time for which the shared spectrum is reserved by the network access device, or a type of LBT procedure to perform prior to transmitting the uplink transmission, or a combination thereof. In some examples, the apparatus may include means for transmitting an uplink grant to the UE for the uplink transmission, and the information indicative of the at least one type of LBT procedure to perform for the uplink transmission may include at least one bit in the uplink grant. In some examples, the information indicative of the at least one type of LBT procedure to perform for the uplink transmission may indicate a duration of a portion of a maximum channel occupancy time for which the shared spectrum is reserved by the network access device and available for uplink transmissions. In some examples, the apparatus may include means for transmitting a common PDCCH, and means for signaling the information indicative of the at least one type of LBT procedure to perform for the uplink transmission in the common PDCCH. In some examples, the apparatus may include means for transmitting at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the apparatus may include means for transmitting an uplink grant for the uplink transmission to the UE, and the at least one indication of the at least one LBT priority class may be transmitted in the uplink grant. In some examples, the uplink grant may further include the information indicative of the at least one type of LBT procedure to perform for the uplink transmission.

In some examples, the apparatus may include transmitting at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of contention window size for a LBT priority class and a default contention window size. In some examples, the method may include means for transmitting an uplink grant for the uplink transmission, and the at least one indication of a contention window size to use for at least one LBT priority class may be signaled in the uplink grant.

In some examples, the apparatus may include means for detecting receipt of the uplink transmission; means for failing to decode a CRC for the uplink transmission; and means for updating, based at least in part on failing to decode the CRC for the uplink transmission, a contention window size for a next LBT procedure to contend for access to the shared spectrum. In some examples, the uplink transmission may include a multiple-TTI uplink transmission, and the apparatus may further include means for transmitting a multiple-TTI uplink grant for the multiple-TTI uplink transmission; means for detecting receipt of the multiple-TTI uplink transmission during at least one TTI of the multiple-TTI uplink transmission; and means for refraining from updating a contention window size for a next LBT procedure to contend for access to the shared spectrum based at least in part on detecting receipt of the multiple-TTI uplink transmission during the at least one TTI of the multiple-TTI uplink transmission. In some examples, the refraining from updating the contention window size for the next LBT procedure may be further based at least in part on not detecting a LBT gap on the shared spectrum during the multiple TTIs of the multiple-TTI uplink transmission.

In some examples, the apparatus may include means for transmitting an indication of a type of multi-carrier LBT procedure to perform for the uplink transmission. In some examples, the type of multi-carrier LBT procedure to perform may include: a type of LBT procedure performed for a UE-selected primary carrier in the shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. In some examples, the indication of the type of multi-carrier LBT procedure to perform may be transmitted in RRC signaling.

In one example, another apparatus for wireless communication at a network access device is described. The apparatus may include a processor, and memory coupled to the processor. The processor may be configured to schedule an uplink transmission of a UE in a shared spectrum, and to transmit, over the air, information indicative of at least one type of LBT procedure to perform for the uplink transmission.

In one example, a computer-readable medium for storing instructions executable by a processor of a network access device is described. The instructions may include instructions to schedule an uplink transmission of a UE in a shared spectrum, and instructions to transmit, over the air, information indicative of at least one type of LBT procedure to perform for the uplink transmission.

In one example, another method for wireless communication at a network access device is described. The method may include determining, based at least in part on a buffer status report (BSR) associated with a UE, an amount of uplink traffic of the UE associated with each LBT priority class of a plurality of LBT priority classes; selecting, based at least in part on the determined amount of uplink traffic of the UE associated with each LBT priority class, a LBT priority class for performing a LBT procedure; and contending for access to a shared spectrum by performing the LBT procedure based at least in part on the selected LBT priority class.

In some examples, the method may include determining, for the UE, an amount of downlink traffic associated with each LBT priority class of the plurality of LBT priority classes. In these examples, the LBT priority class for performing the LBT procedure may be further selected based at least in part on the determined amount of downlink traffic associated with each LBT priority class.

In one examples, another apparatus for wireless communication at a network access device is described. The apparatus may include means for determining, based at least in part on a BSR associated with a UE, an amount of uplink traffic of the UE associated with each LBT priority class of a plurality of LBT priority classes; means for selecting, based at least in part on the determined amount of uplink traffic of the UE associated with each LBT priority class, a LBT priority class for performing a LBT procedure; and means for contending for access to a shared spectrum by performing the LBT procedure based at least in part on the selected LBT priority class.

In some examples, the apparatus may include means for determining, for the UE, an amount of downlink traffic associated with each LBT priority class of the plurality of LBT priority classes. In these examples, the LBT priority class for performing the LBT procedure may be further selected based at least in part on the determined amount of downlink traffic associated with each LBT priority class.

In one example, another apparatus for wireless communication at a network access device is described. The apparatus may include a processor, and memory coupled to the processor. The processor may be configured to determine, based at least in part on a BSR associated with a UE, an amount of uplink traffic of the UE associated with each LBT priority class of a plurality of LBT priority classes; to select, based at least in part on the determined amount of uplink traffic of the UE associated with each LBT priority class, a LBT priority class for performing a LBT procedure; and to contend for access to a shared spectrum by performing the LBT procedure based at least in part on the selected LBT priority class.

In one example, another computer-readable medium for storing instructions executable by a processor of a network access device is described. The instructions may include instructions to determine, based at least in part on a BSR associated with a UE, an amount of uplink traffic of the UE associated with each LBT priority class of a plurality of LBT priority classes; instructions to select, based at least in part on the determined amount of uplink traffic of the UE associated with each LBT priority class, a LBT priority class for performing a LBT procedure; and instructions to contend for access to a shared spectrum by performing the LBT procedure based at least in part on the selected LBT priority class.

In one example, a method for wireless communication is described. The method may include determining an amount of queued traffic associated with each LBT priority class of a plurality of LBT priority classes; selecting a LBT priority class for performing a LBT procedure; performing the LBT procedure based at least in part on the selected LBT priority class to contend for access to a shared spectrum; and transmitting, upon winning contention for access to the shared spectrum, at least some of the queued traffic associated with a lower LBT priority class than the selected LBT priority class.

In one example, an apparatus for wireless communication is described. The apparatus may include means for determining an amount of queued traffic associated with each LBT priority class of a plurality of LBT priority classes; means for selecting a LBT priority class for performing a LBT procedure; means for performing the LBT procedure based at least in part on the selected LBT priority class to contend for access to a shared spectrum; and means for transmitting, upon winning contention for access to the shared spectrum, at least some of the queued traffic associated with a lower LBT priority class than the selected LBT priority class.

In one example, another apparatus for wireless communication is described. The apparatus may include a processor, and memory coupled to the processor. The, processor may be configured to determine an amount of queued traffic associated with each LBT priority class of a plurality of LBT priority classes; to select a LBT priority class for performing a LBT procedure; to perform the LBT procedure based at least in part on the selected LBT priority class to contend for access to a shared spectrum; and to transmit, upon winning contention for access to the shared spectrum, at least some of the queued traffic associated with a lower LBT priority class than the selected LBT priority class.

In one example, a computer-readable medium for storing instructions executable by a processor is described. The instructions may include instructions to determine an amount of queued traffic associated with each LBT priority class of a plurality of LBT priority classes; instructions to select a LBT priority class for performing a LBT procedure; instructions to perform the LBT procedure based at least in part on the selected LBT priority class to contend for access to a shared spectrum; and instructions to transmit, upon winning contention for access to the shared spectrum, at least some of the queued traffic associated with a lower LBT priority class than the selected LBT priority class.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared spectrum is used for at least a portion of communications in a wireless communication system. In some examples, the shared spectrum may be used for Long Term Evolution (LTE) or LTE-Advanced (LTE-A) communications. The shared spectrum may be used in combination with, or independent from, a licensed spectrum. The licensed spectrum may include a radio frequency spectrum licensed to particular users for particular uses. The shared spectrum may include an unlicensed spectrum, a radio frequency spectrum available for Wi-Fi use, a radio frequency spectrum available for use by different radio access technologies, or a radio frequency spectrum available for use by multiple mobile network operators (MNOs) in an equally shared or prioritized manner.

With increasing data traffic in cellular networks that use a licensed spectrum, offloading of at least some data traffic to a shared spectrum may provide a cellular operator (e.g., an operator of a public land mobile network (PLMN) or a coordinated set of base stations defining a cellular network, such as an LTE/LTE-A network) with opportunities for enhanced data transmission capacity. Use of a shared spectrum may also provide service in areas where access to a licensed spectrum is unavailable. Before communicating over a shared spectrum band, a transmitting apparatus may perform a LBT procedure to contend for access to the shared spectrum. Such an LBT procedure may include performing a clear channel assessment (CCA) procedure (or extended CCA procedure) to determine whether a channel of the shared spectrum is available. When it is determined that the channel of the shared spectrum is available, a channel reservation signal (e.g., a channel usage beacon signal (CUBS)) may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
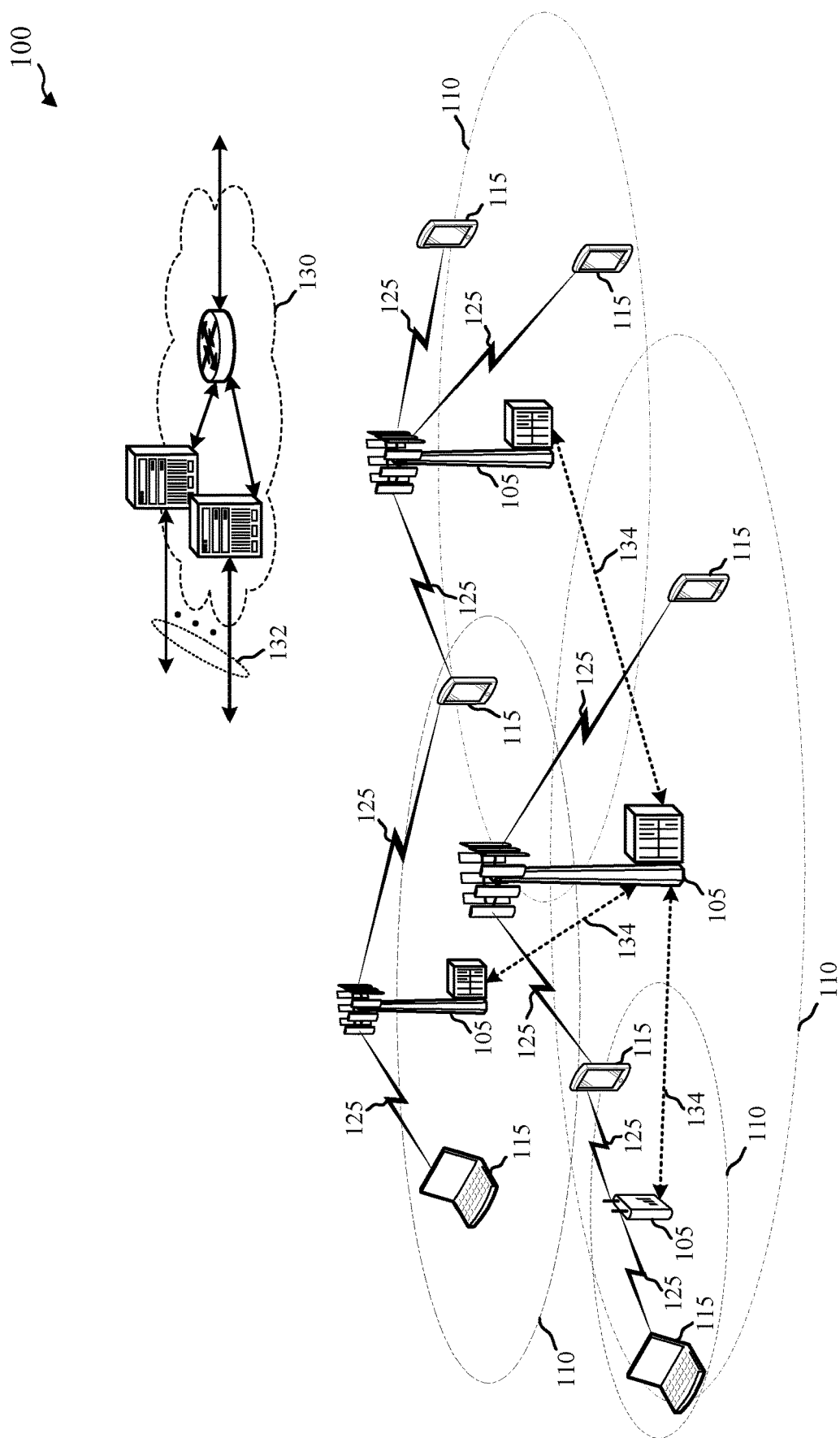
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base stations. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a licensed spectrum (e.g., a radio frequency spectrum licensed to particular users for particular uses) or a shared spectrum (e.g., an unlicensed spectrum, a radio frequency spectrum that is available for Wi-Fi use, a radio frequency spectrum that is available for use by different radio access technologies, or a radio frequency spectrum that is available for use by multiple MNOs in an equally shared or prioritized manner).

Figure 2:
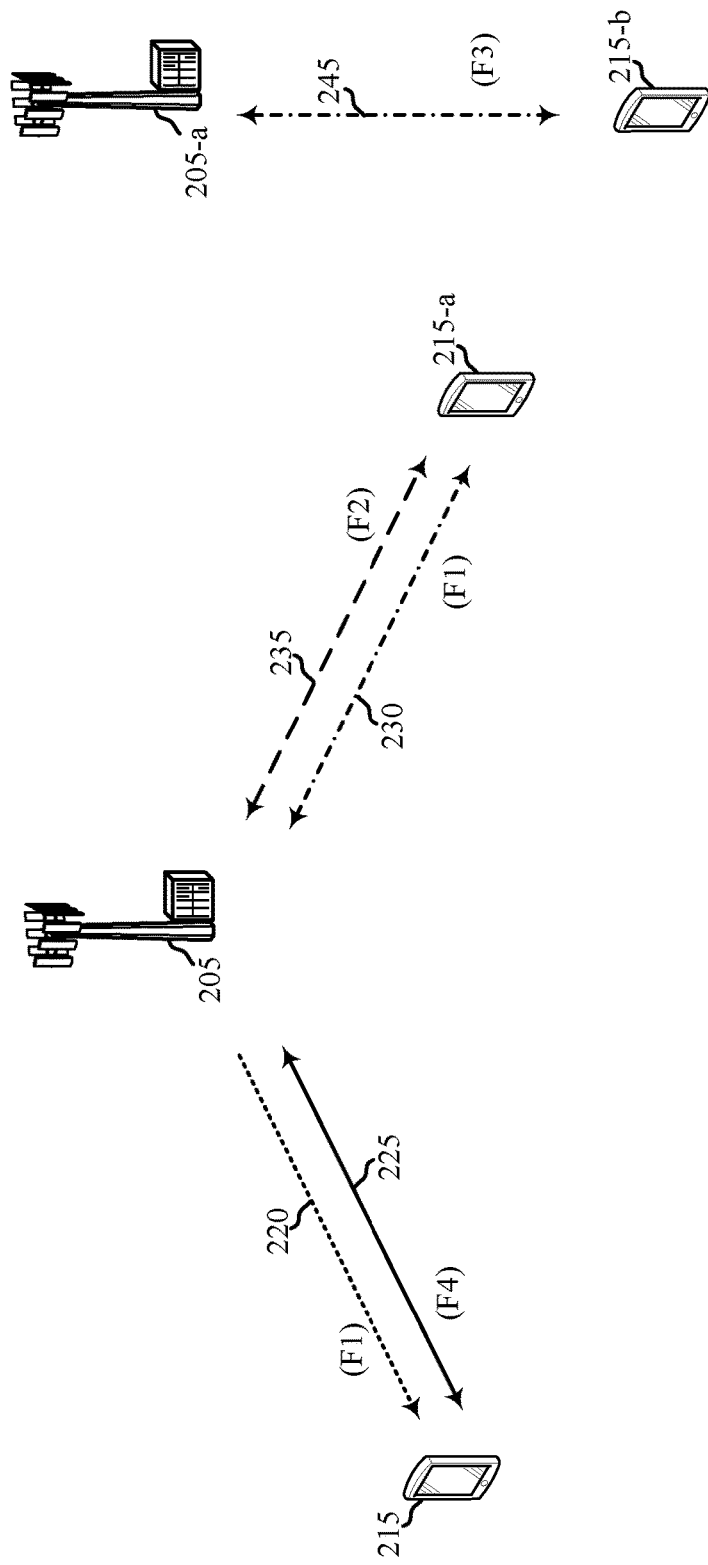
FIG. 2 shows a wireless communication system in which LTE/LTE-A may be deployed under different scenarios using a shared spectrum, in accordance with various aspects of the present disclosure.

FIG. 2 shows a wireless communication system 200 in which LTE/LTE-A may be deployed under different scenarios using a shared spectrum, in accordance with various aspects of the present disclosure. More specifically, FIG. 2 illustrates examples of a supplemental downlink mode (also referred to as a first licensed assisted access (LAA) mode), a carrier aggregation mode (also referred to as a second licensed assisted access mode), and a standalone mode, in which LTE/LTE-A is deployed using a shared spectrum. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, and a third UE 215-*b* may be examples of aspects of one or more of the UEs 115 described with reference to FIG. 1.

In the example of the supplemental downlink mode (e.g., the first licensed assisted access mode) in the wireless communication system 200, the first base station 205 may transmit OFDMA waveforms to the first UE 215 using a downlink channel 220. The downlink channel 220 may be associated with a frequency F1 in a shared spectrum. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed spectrum. The downlink channel 220 in the shared spectrum and the first bidirectional link 225 in the licensed spectrum may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a MNO) that uses a licensed spectrum and needs to relieve some of the traffic or signaling congestion.

In the example of the carrier aggregation mode (e.g., the second licensed assisted access mode) in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared spectrum. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed spectrum. The third bidirectional link 235 may provide a downlink and uplink capacity offload for the first base station 205. Like the supplemental downlink mode (e.g., the first licensed assisted access mode) described above, this scenario may occur with any service provider (e.g., MNO) that uses a licensed spectrum and needs to relieve some of the traffic or signaling congestion.

As described above, one type of service provider that may benefit from the capacity offload offered by using LTE/LTE-A in a shared spectrum is a traditional MNO having access rights to an LTE/LTE-A licensed spectrum. For these service providers, an operational example may include a bootstrapped mode (e.g., supplemental downlink, carrier aggregation) that uses the LTE/LTE-A primary component carrier (PCC) on the licensed spectrum and at least one secondary component carrier (SCC) on the shared spectrum.

In the carrier aggregation mode, data and control may, for example, be communicated in the licensed spectrum (e.g., via the third bidirectional link 235) while data may, for example, be communicated in the shared spectrum (e.g., via second bidirectional link 230). The carrier aggregation mechanisms supported when using a shared spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the third UE 215-*b* using a bidirectional link 245 and may receive OFDMA waveforms, SC-FDMA waveforms, or resource block interleaved FDMA waveforms from the third UE 215-*b* using the bidirectional link 245. The bidirectional link 245 may be associated with the frequency F3 in the shared spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed spectrum.

In some examples, a transmitting apparatus such as one of the base stations 105, 205, or 205-*a* described with reference to FIG. 1 or 2, or one of the UEs 115, 215, 215-*a*, or 215-*b* described with reference to FIG. 1 or 2, may use a gating interval to gain access to a wireless channel of a shared spectrum (e.g., to a physical channel of the shared spectrum). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (ECCA) procedure. The outcome of the CCA procedure or ECCA procedure may indicate to the transmitting apparatus whether a wireless channel of a shared spectrum is available or in use for the gating interval (e.g., an LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the shared spectrum during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in a shared spectrum.

Figure 3:
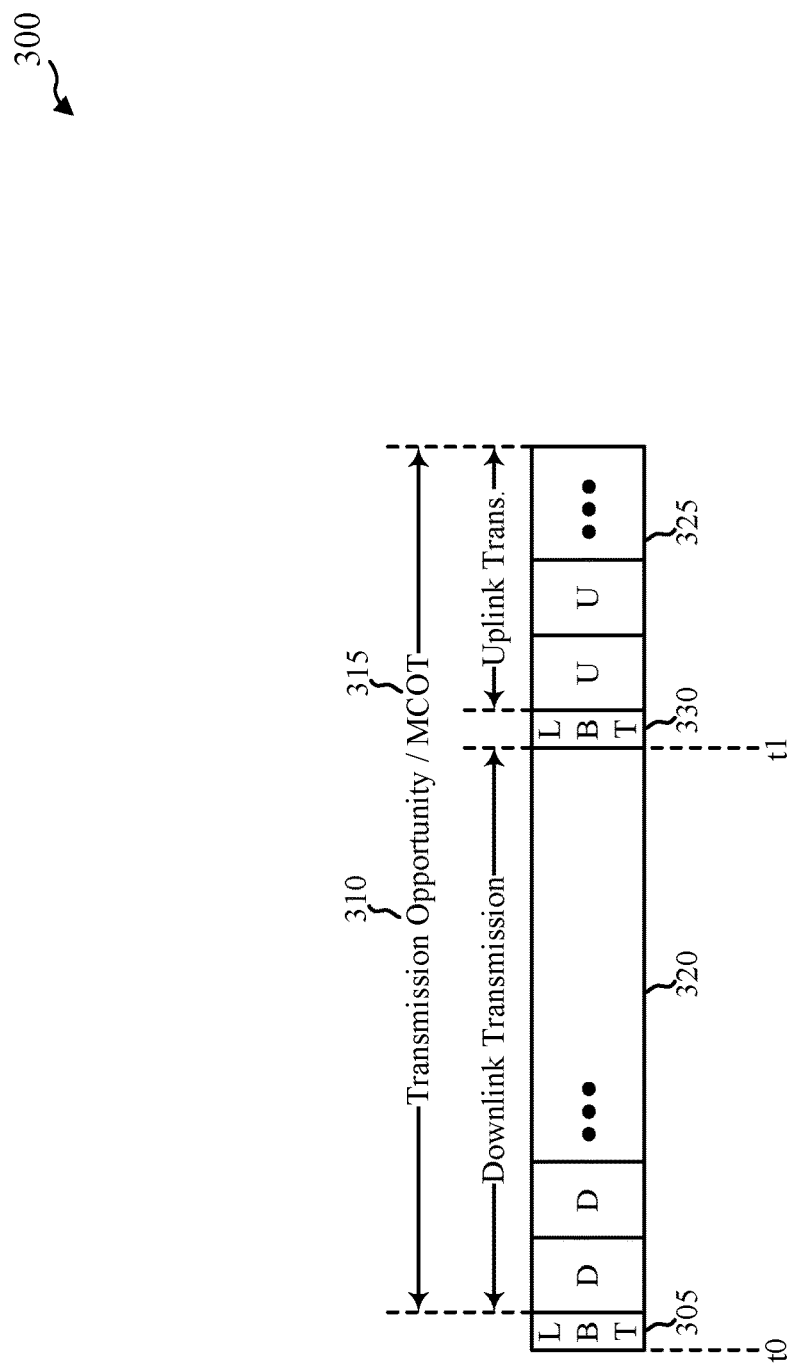
FIG. 3 shows a timeline of wireless communications between a base station and number of UEs, in accordance with various aspects of the present disclosure.

FIG. 3 shows a timeline 300 of wireless communications between a base station and number of UEs, in accordance with various aspects of the present disclosure. The wireless communications may occur in a shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. In some examples, the base station(s) and UE(s) that communicate in the shared spectrum may be examples of aspects of the base stations 105, 205, or 205-a and UEs 115, 215, 215-a, or 215-b described with reference to FIG. 1 or 2.

In some examples, a base station may perform a LBT procedure 305 (e.g., a CCA procedure or ECCA procedure) at a time t0, prior to a transmission opportunity 310. The LBT procedure 305 may be performed to contend for access to the shared spectrum during the transmission opportunity 310. The transmission opportunity 310 may be associated with a maximum channel occupancy time (MCOT 315). When the base station wins contention for access to the shared spectrum for the transmission opportunity 310, the base station may transmit to one or more UEs during a number of transmission time intervals (TTIs) (e.g., during a number of downlink (D) subframes). The base station may also schedule uplink transmissions from one or more UEs during a number of TTIs (e.g., during a number of uplink (U) subframes). When the base station loses contention for access to the shared spectrum for the transmission opportunity 310, the base station may not transmit or schedule uplink transmissions during the transmission opportunity 310, and may have to delay communication with one or more UEs until a subsequent transmission opportunity (e.g., a subsequent transmission opportunity for which the base station wins contention for access to the shared spectrum). FIG. 3 assumes the base station wins contention for access to the shared spectrum during the LBT procedure 305.

By way of example, the timeline 300 shows a downlink period 320 followed by an uplink period 325 that ends within the transmission opportunity 310. A downlink transmission may be transmitted during the downlink period 320, and an uplink transmission may be transmitted during the uplink period 325. One or more uplink grants for the uplink transmission may be transmitted and received during the downlink period 320. Prior to transmitting an uplink transmission during the uplink period 325, a UE may perform a LBT procedure 330 (e.g., a CCA procedure or ECCA procedure) at a time t1, prior to the uplink period 325. The LBT procedure 330 may be performed to contend for access to the shared spectrum for an uplink transmission during the uplink period 325. When the UE wins contention for access to the shared spectrum for the uplink transmission, the UE may transmit to the base station during a number of TTIs (e.g., during a number of U subframes). When the UE loses contention for access to the shared spectrum for the uplink transmission, the UE may not transmit during the uplink period 325, and may have to delay communication with the base station until a subsequent uplink period (e.g., a subsequent uplink period for which the UE wins contention for access to the shared spectrum). FIG. 3 assumes the UE wins contention for access to the shared spectrum for an uplink transmission during the uplink period 325.

In some examples, the base station may transmit, and the UE may receive, over the air (e.g., in the shared spectrum), information indicative of at least one type of LBT procedure to perform for the uplink transmission. The information may be transmitted/received prior to performance of the LBT procedure 330. In some examples, the information indicative of the at least one type of LBT procedure to perform for the uplink transmission may indicate whether a duration of the uplink transmission is within the MCOT 315 for which the shared spectrum was reserved by the base station. In some examples, the information indicative of the at least one type of LBT procedure to perform for the uplink transmission may indicate a type of LBT procedure to perform prior to transmitting the uplink transmission. In some examples, the indication of whether the duration of the uplink transmission is within the MCOT 315, or the indication of the type of LBT to perform prior to transmitting the uplink transmission, may be transmitted/received as at least one bit in the uplink grant for the uplink transmission.

In some examples, the information indicative of the at least one type of LBT procedure to perform for the uplink transmission may indicate a duration of a portion of the MCOT 315 for which the shared spectrum is reserved by the base station and available for uplink transmissions (e.g., the portion of the MCOT 315 following the downlink period 320). In some examples, the indication of the duration of the portion of the MCOT 315 for which the shared spectrum is reserved by the base station and available for uplink transmissions may be signaled in a common PDCCH received by more than one (or all) UEs. A UE that receives the duration of the portion of the MCOT 315 for which the shared spectrum is reserved by the base station and available for uplink transmissions may use the duration of the MCOT portion 315 and a duration of an uplink transmission to determine whether the duration of the uplink transmission is within the MCOT 315.

In some examples, a UE receiving the information indicative of the at least one type of LBT procedure to perform for the uplink transmission may use the information to determine that an uplink transmission of the UE has a duration that is within the MCOT 315. The UE may also determine that, because the uplink transmission has a duration that is within the MCOT 315, the LBT procedure 330 may be a shorter LBT procedure (e.g., a 25 microsecond (µs)).

Figure 4:
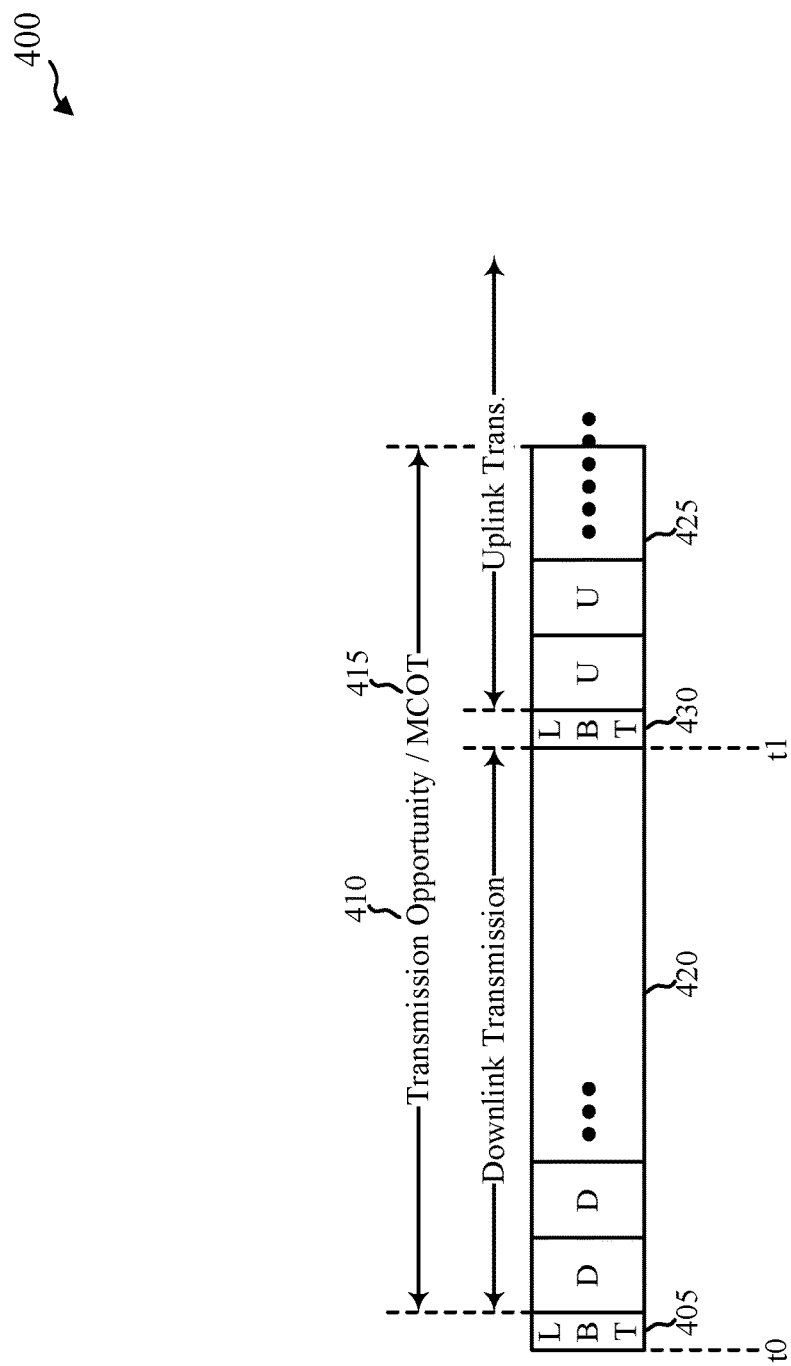
FIG. 4 shows a timeline of wireless communications between a base station and number of UEs, in accordance with various aspects of the present disclosure.

FIG. 4 shows a timeline 400 of wireless communications between a base station and number of UEs, in accordance with various aspects of the present disclosure. The wireless communications may occur in a shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. In some examples, the base station(s) and UE(s) that communicate in the shared spectrum may be examples of aspects of the base stations 105, 205, or 205-a and UEs 115, 215, 215-a, or 215-b described with reference to FIG. 1 or 2.

In some examples, a base station may perform a LBT procedure 405 (e.g., a CCA procedure or ECCA procedure) at a time t0, prior to a transmission opportunity 410. The LBT procedure 405 may be performed to contend for access to the shared spectrum during the transmission opportunity 410. The transmission opportunity 410 may be associated with a MCOT 415. When the base station wins contention for access to the shared spectrum for the transmission opportunity 410, the base station may transmit to one or more UEs during a number of TTIs (e.g., during a number of D subframes). The base station may also schedule uplink transmissions from one or more UEs during a number of TTIs (e.g., during a number of U subframes). When the base station loses contention for access to the shared spectrum for the transmission opportunity 410, the base station may not transmit or schedule uplink transmissions during the transmission opportunity 410, and may have to delay communication with one or more UEs until a subsequent transmission opportunity (e.g., a subsequent transmission opportunity for which the base station wins contention for access to the shared spectrum). FIG. 4 assumes the base station wins contention for access to the shared spectrum during the LBT procedure 405.

By way of example, the timeline 400 shows a downlink period 420 followed by an uplink period 425. The uplink period 425 may extend past an end of the transmission opportunity 410. A downlink transmission may be transmitted during the downlink period 420, and an uplink transmission may be transmitted during the uplink period 425. One or more uplink grants for the uplink transmission may be transmitted and received during the downlink period 420. Prior to transmitting an uplink transmission during the uplink period 425, a UE may perform a LBT procedure 430 (e.g., a CCA procedure or ECCA procedure) at a time t1, prior to the uplink period 425. The LBT procedure 430 may be performed to contend for access to the shared spectrum for an uplink transmission during the uplink period 425. When the UE wins contention for access to the shared spectrum for the uplink transmission, the UE may transmit to the base station during a number of TTIs (e.g., during a number of U subframes). When the UE loses contention for access to the shared spectrum for the uplink transmission, the UE may not transmit during the uplink period 425, and may have to delay communication with the base station until a subsequent uplink period (e.g., a subsequent uplink period for which the UE wins contention for access to the shared spectrum). FIG. 4 assumes the UE wins contention for access to the shared spectrum for an uplink transmission during the uplink period 425.

In some examples, the base station may transmit, and the UE may receive, over the air (e.g., in the shared spectrum), information indicative of at least one type of LBT procedure to perform for the uplink transmission. The information may be transmitted/received prior to performance of the LBT procedure 430. In some examples, the information indicative of the at least one type of LBT procedure to perform for the uplink transmission may indicate whether a duration of the uplink transmission is within the MCOT 415 for which the shared spectrum was reserved by the base station. In some examples, the information indicative of the at least one type of LBT procedure to perform for the uplink transmission may indicate a type of LBT procedure to perform prior to transmitting the uplink transmission. In some examples, the indication of whether the duration of the uplink transmission is within the MCOT 415, or the indication of the type of LBT to perform prior to transmitting the uplink transmission, may be transmitted/received as at least one bit in the uplink grant for the uplink transmission.

In some examples, the information indicative of the at least one type of LBT procedure to perform for the uplink transmission may indicate a duration of a portion of the MCOT 415 for which the shared spectrum is reserved by the base station and available for uplink transmissions (e.g., the portion of the MCOT 415 following the downlink period 420). In some examples, the indication of the duration of the portion of the MCOT 415 for which the shared spectrum is reserved by the base station and available for uplink transmissions may be signaled in a common PDCCH received by more than one (or all) UEs. A UE that receives the duration of the portion of the MCOT 415 for which the shared spectrum is reserved by the base station and available for uplink transmissions may use the duration of the MCOT portion 415 and a duration of an uplink transmission to determine whether the duration of the uplink transmission is within the MCOT 415.

In some examples, a UE receiving the information indicative of the at least one type of LBT procedure to perform for the uplink transmission may use the information to determine that an uplink transmission of the UE has a duration that exceeds the MCOT 415. The UE may also determine that, because the uplink transmission has a duration that exceeds the MCOT 415, the LBT procedure 430 may be a shorter type of LBT procedure (e.g., a 25 μs), but a longer type of LBT procedure (e.g., a category 4 (CAT 4) LBT procedure) needs to be performed before continuing the uplink transmission past the end of the MCOT 415. Alternatively, the UE may determine that, because the uplink transmission has a duration that exceeds the MCOT 415, the LBT procedure 430 may need to be a longer type of LBT procedure (e.g., a CAT 4 LBT procedure). A longer LBT procedure may be performed using parameters for a LBT priority class. When performing a LBT procedure associated with a LBT priority class, the UE may continue to transmit as long as allowed by the parameters of the LBT priority class (subject to scheduling constraints of the base station).

In some examples, the LBT procedure 305 or 405 performed by the base station in FIG. 3 or 4 may be performed for multiple carriers included in a multiple-carrier transmission opportunity. Similarly, the LBT procedure 330 or 430 performed by the UE in FIG. 3 or 4 may be performed for multiple carriers included in a multiple-carrier transmission opportunity.

Figure 5:
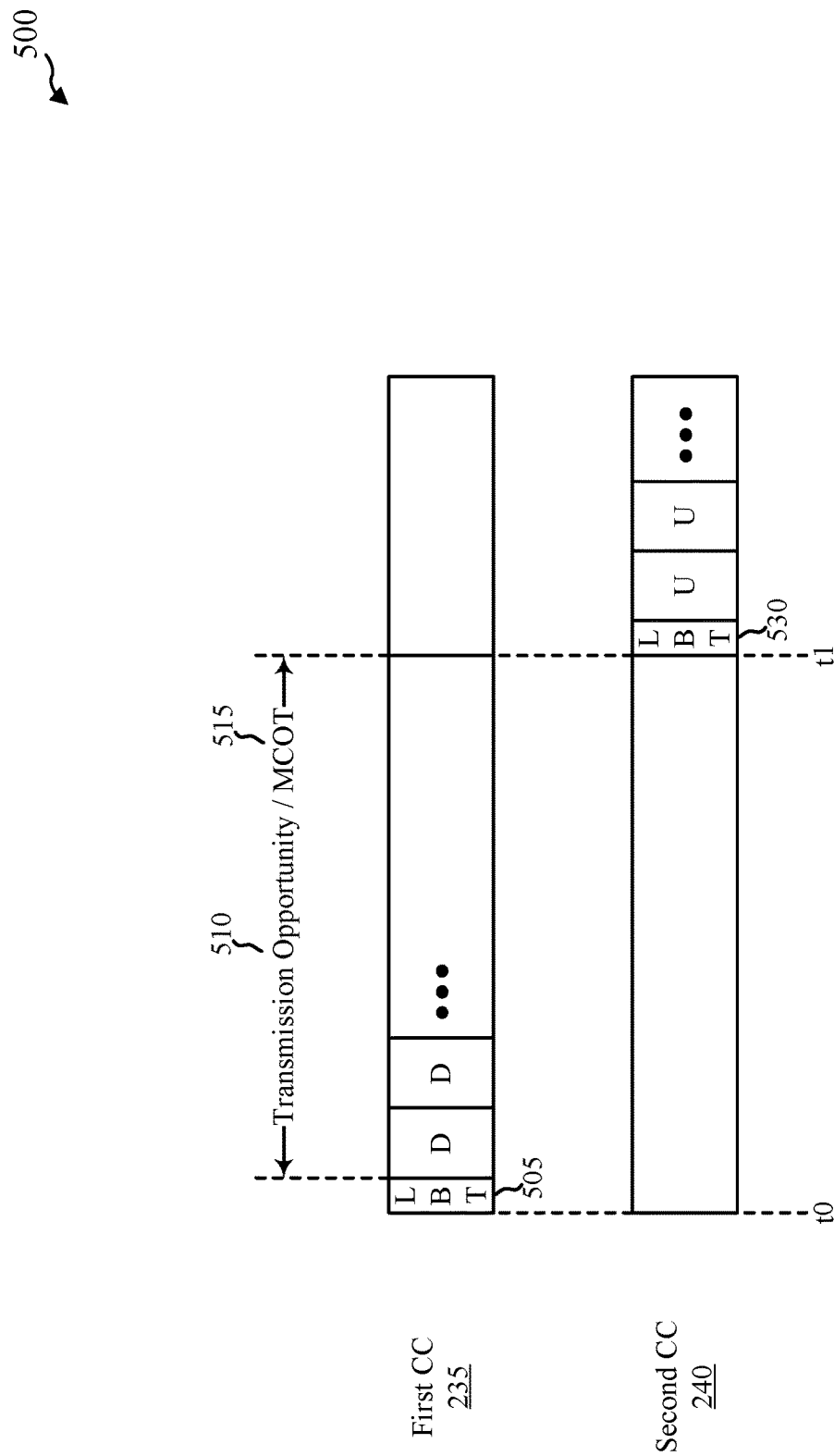
FIG. 5 shows a timeline of wireless communications between a base station and number of UEs, in accordance with various aspects of the present disclosure.

FIG. 5 shows a timeline 500 of wireless communications between a base station and number of UEs, in accordance with various aspects of the present disclosure. The wireless communications may occur over multiple carriers (e.g., at least a first carrier 535 and a second carrier 540) in a shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. In some examples, the base station(s) and UE(s) that communicate in the shared spectrum may be examples of aspects of the base stations 105, 205, or 205-a and UEs 115, 215, 215-a, or 215-b described with reference to FIG. 1 or 2.

In some examples, a base station may perform a LBT procedure 505 (e.g., a CCA procedure or ECCA procedure) at a time t0, prior to a transmission opportunity 510 on at least the first carrier 535. The LBT procedure 505 may be performed to contend for access to at least the first carrier 535 in the shared spectrum during the transmission opportunity 510. The transmission opportunity 510 may be associated with a maximum channel occupancy time (MCOT 515). When the base station wins contention for access to at least the first carrier 535 in the shared spectrum for the transmission opportunity 510, the base station may transmit to one or more UEs during a number of TTIs (e.g., during a number of D subframes). The base station may also schedule uplink transmissions from one or more UEs during a number of TTIs (e.g., during a number of U subframes). In some examples, the uplink transmissions may be cross-carrier scheduled (e.g., scheduled on a different carrier than the carrier on which the base station transmits, such as scheduled on at least the second carrier 540 when the base station transmits on at least the first carrier 535). When the base station loses contention for access to the first carrier 535 in the shared spectrum for the transmission opportunity 510, the base station may not transmit on the first carrier 535, but may in some cases schedule uplink transmissions on at least the second carrier 540 during the transmission opportunity 510. In some examples, an uplink transmission may be cross-carrier scheduled using semi-persistent scheduling (SPS).

Prior to transmitting a cross-carrier scheduled uplink transmission on at least the second carrier 540, a UE may perform a LBT procedure 530 (e.g., a CCA procedure or ECCA procedure) at a time t1, prior to the uplink transmission. The LBT procedure 530 may be performed to contend for access to at least the second carrier 540 of the shared spectrum for the uplink transmission. When the UE wins contention for access to at least the second carrier 540 of the shared spectrum for the uplink transmission, the UE may transmit to the base station during a number of TTIs (e.g., during a number of U subframes). When the UE loses contention for access to the second carrier 540 in the shared spectrum for the uplink transmission, the UE may not transmit the uplink transmission on the second carrier 540, and may have to delay transmitting the uplink transmission to the base station.

In some examples, the base station may transmit, and the UE may receive, over the air (e.g., in the shared spectrum), information indicative of at least one type of LBT procedure to perform for the uplink transmission. The information may be transmitted/received prior to performance of the LBT procedure 530.

In some examples, a base station may choose parameters for a LBT procedure performed for a transmission opportunity including a downlink period and an uplink period. For example, a base station may choose parameters for the LBT procedure 305 or 405 described with reference to FIG. 3 or 4. In these examples, the base station may choose the parameters for the LBT procedure based at least in part on a LBT priority class (e.g., based on one of a plurality of LBT priority classes, in which each LBT priority class is associated with a priority class of data queued for transmission and a set of one or more parameters for performing a LBT procedure for the LBT priority class). In some examples, the LBT priority class may be selected by the base station based at least in part on a determined amount of downlink traffic (for one or more UEs) associated with each LBT priority class of the plurality of LBT priority classes. The LBT priority class may also be selected by the base station based at least in part on a determined amount of uplink traffic (for one or more UEs) associated with each LBT priority class of the plurality of LBT priority classes, or based at least in part on a combination of the determined amounts of downlink traffic and uplink traffic associated with each LBT priority class of the plurality of LBT priority classes. The one or more UEs may include UEs for which uplink transmissions are scheduled (or to be scheduled) for the transmission opportunity. In some examples, the base station may determine the amount of uplink traffic associated with each LBT priority class of the plurality of LBT priority classes based at least in part on a buffer status report (BSR) associated with a UE (or based on a plurality of BSRs associated with a plurality of UEs). Each BSR may in some examples include a last-received BSR from a UE.

In some examples, a base station may successfully contend for access to a shared spectrum for a transmission opportunity based at least in part on a LBT procedure performed for a selected LBT priority class. When an uplink transmission beginning (or occurring) within the transmission opportunity is same-carrier scheduled (e.g., self-scheduled) for a UE, the base station may signal, to the UE, the LBT priority class used by the base station when performing the LBT procedure to contend for access to the shared spectrum for the transmission opportunity. When an uplink transmission beginning (or occurring) within the transmission opportunity is cross-carrier scheduled for a UE, the base station may signal, to the UE, a first LBT priority class used by the base station when performing the LBT procedure to contend for access to the shared spectrum for the transmission opportunity, and a second LBT priority class to be used by the UE for performing a type of LBT procedure for the uplink transmission when contention for access to the shared spectrum by the base station is unsuccessful. In some examples, the UE may select the first LBT priority class or the second LBT priority class for performing a LBT procedure, based at least in part on whether the base station successfully contended for access to the shared spectrum for the transmission opportunity.

In some examples, a UE that performs a LBT procedure based at least in part on a LBT priority class may transmit data associated with any LBT priority class. In other examples, a UE that performs a LBT procedure based at least in part on a LBT priority class may select data for transmission based at least in part on the LBT priority class. For example, the UE may select data associated with the LBT priority class. Alternatively, and as another example, the UE may select data associated with an LBT priority class of equal or lower LBT priority class than the LBT priority class used to perform the LBT procedure. Alternatively, and as another example, the UE may select data associated with an LBT priority class of lower LBT priority class than the LBT priority class used to perform the LBT procedure, but only after transmitting all data associated with the LBT priority class used to perform the LBT procedure.

In some examples, a base station or UE that performs a LBT procedure based at least in part on a LBT priority class may perform a priority inversion, in which data associated with a higher LBT priority class is swapped with data associated with a lower LBT priority class. Such a priority inversion may enable a base station or UE to transmit lower priority data having quality of service (QoS) requirements that are temporarily higher than the QoS requirements of higher priority data. The swapped data (i.e., the data associated with the higher LBT priority class) may then be counted as lower priority data for the purpose of performing a LBT procedure.

In some examples, a UE that performs a LBT procedure based at least in part on a LBT priority class may receive, over the air, an indication of the LBT priority class from a base station (with the indication of the LBT priority class being signaled just to the UE, or to a group of UEs or all UEs). In other examples, a UE may select a LBT priority class for performing a LBT procedure without receiving an indication of the LBT priority class from a base station. In these latter examples, the UE may receive, over the air, (e.g., from a base station) at least one indication of a contention window size to use for at least one LBT priority class, and may size a contention window for the LBT procedure based at least in part on an indication of a contention window size corresponding to the selected LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of a contention window size for a LBT priority class and a default contention window size (e.g., a minimum contention window size (CW_min)). Thus, for example, when a base station signals a ratio of contention window sizes of 4, and a UE selects a LBT priority class associated with a minimum contention window size of CW_min=15 µs, the UE may multiply 15 µs and 4 to get 60 µs, and may size a contention window to 60 µs (or to a next higher contention window size of a plurality of available contention window sizes (e.g., to 63 µs, when the available contention window sizes include 15 µs, 31 µs, and 63 µs). In other examples, the at least one indication of a contention window size to use for at least one LBT priority class may include one or more bits indicating an update of a contention window size from a prior-used contention window size.

When an uplink transmission is dependent on the outcome of a LBT procedure performed by a UE, a base station may attempt to determine an outcome of the LBT procedure. For a UE expected to perform a LBT procedure prior to transmitting an uplink transmission (e.g., a physical uplink shared channel (PUSCH)), possible scenarios that may occur after a base station transmits an uplink grant for the uplink transmission include: 1) the UE may not receive or decode the uplink grant; or 2) the UE may not transmit the uplink transmission because contention for access to a shared spectrum is not win when performing the LBT procedure; or 3) the base station may not detect the uplink transmission; or 4) the base station may detect the uplink transmission (or something that may be the uplink transmission) but may fail to decode a CRC for the uplink transmission. Note that a LAA uplink transmission may not have a preamble, and hence a preamble may not be used to determine whether a LAA uplink transmission is detected. However, a LAA uplink transmission may in some cases be detected based at least in part on the detection of an uplink demodulation reference signal (DMRS) or sounding reference signal (SRS) associated with the LAA uplink transmission. In some examples, a contention window size used by the base station to perform a next LBT procedure may be updated in response to scenario 1) or 4), but not updated in response to scenario 2) or 3). In other examples, and assuming downlink traffic is present during a transmission opportunity, contention window size update based on an outcome of a downlink transmission (e.g., a physical downlink shared channel (PDSCH) transmission) may be sufficient; the success of uplink grant reception and decoding can be ignored; and a contention window size used by the base station to perform a next LBT procedure may be updated in response to scenario 4), but not updated in response to scenarios 1), 2), or 3). For a multiple-TTI uplink grant for a multiple-TTI uplink transmission, and in some examples, a base station that detects receipt of the multiple-TTI uplink transmission during at least one TTI of the multiple-TTI uplink transmission may assume the multiple-TTI uplink transmission is transmitted during other TTIs of the multiple-TTI uplink transmission and refrain from updating a contention window size for a next LBT procedure, unless the base station detects a LBT gap on the shared spectrum during the multiple TTIs of the multiple-TTI uplink transmission.

In some examples, a UE may identify a type of multi-carrier LBT procedure to perform for an uplink transmission. In some examples, the UE may receive, over the air, information indicative of the type of multi-carrier LBT procedure to perform for the uplink transmission. In some examples, the type of multi-carrier LBT procedure to perform may include: a type of LBT procedure performed for a UE-selected primary carrier in a shared spectrum; or a type of LBT procedure performed for a physical uplink control channel (PUCCH) carrier in the shared spectrum, where the PUCCH carrier is designated as a primary carrier; or a type of LBT procedure performed for a UE-selected carrier in the shared spectrum; or a type of LBT procedure performed for a network access device-selected carrier in the shared spectrum; or a type of LBT procedure performed for multiple carriers in the shared spectrum. In some examples, the indication of the type of multi-carrier LBT procedure to perform may be received in RRC signaling.

Figure 6:
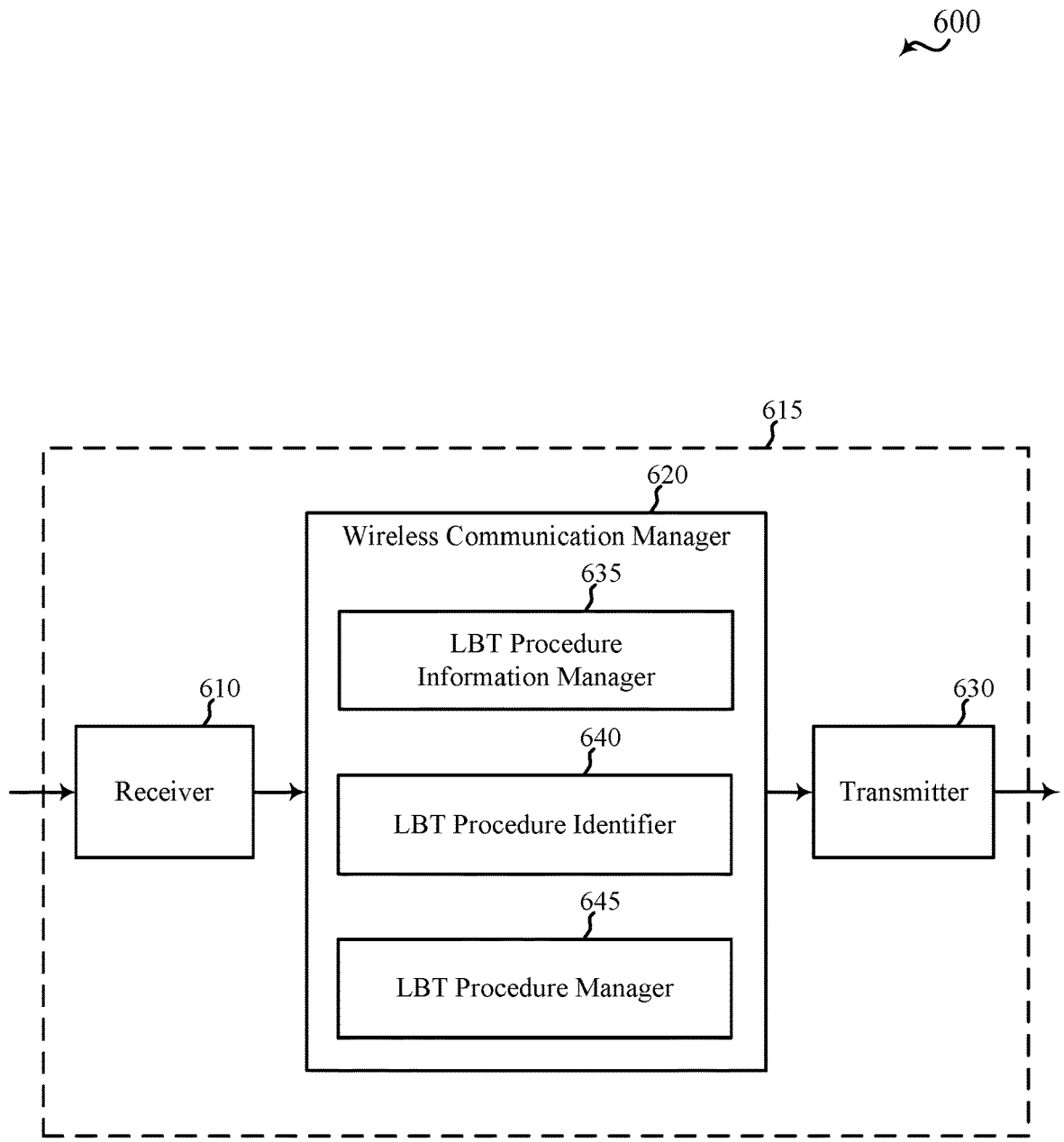
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 215, 215-a, or 215-b described with reference to FIG. 1 or 2. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency (RF) receiver, such as at least one RF receiver operable to receive transmissions over a licensed spectrum (e.g., a radio frequency spectrum licensed to particular users for particular uses) or a shared spectrum (e.g., an unlicensed spectrum, a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the shared spectrum may be used for LTE/LTE-A communications, as described, for example, with reference to FIG. 1, 2, 3, 4, or 5. The receiver 610 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the transmitter 630 may include at least one RF transmitter, such as at least one RF transmitter operable to transmit over the licensed spectrum or the shared spectrum. The transmitter 630 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include a LBT procedure information manager 635, a LBT procedure identifier 640, or a LBT procedure manager 645.

The LBT procedure information manager 635 may be used to receive, over the air (e.g., in the shared spectrum), information indicative of at least one type of LBT procedure to perform for an uplink transmission. In some examples, the information indicative of the at least one type of LBT procedure to perform for the uplink transmission may include at least one bit received in an uplink grant received (by the wireless communication manager 620) for the uplink transmission. In some examples, the information indicative of the at least one type of LBT procedure to perform for the uplink transmission may be signaled in a common PDCCH received by the wireless communication manager 620.

In some examples, the information indicative of the at least one type of LBT procedure to perform for the uplink transmission may indicate at least one of: whether a duration of the uplink transmission is within a maximum channel occupancy time for which a shared spectrum is reserved by a network access device, or a type of LBT procedure to perform prior to transmitting the uplink transmission, or a combination thereof. In these examples, the information may include at least one bit received in an uplink grant.

In some examples, the information indicative of the at least one type of LBT procedure to perform for the uplink transmission may indicate a duration of a portion of a maximum channel occupancy time for which the shared spectrum is reserved by a network access device and available for uplink transmissions. In these examples, the information indicative of the at least one type of LBT procedure to perform for the uplink transmission may be signaled in a common PDCCH.

The LBT procedure identifier 640 may be used to identify, from the received information, the at least one type of LBT procedure to perform for the uplink transmission. When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

The LBT procedure manager 645 may be used to include performing, for a shared spectrum, the at least one type of LBT procedure for the uplink transmission.

Figure 7:
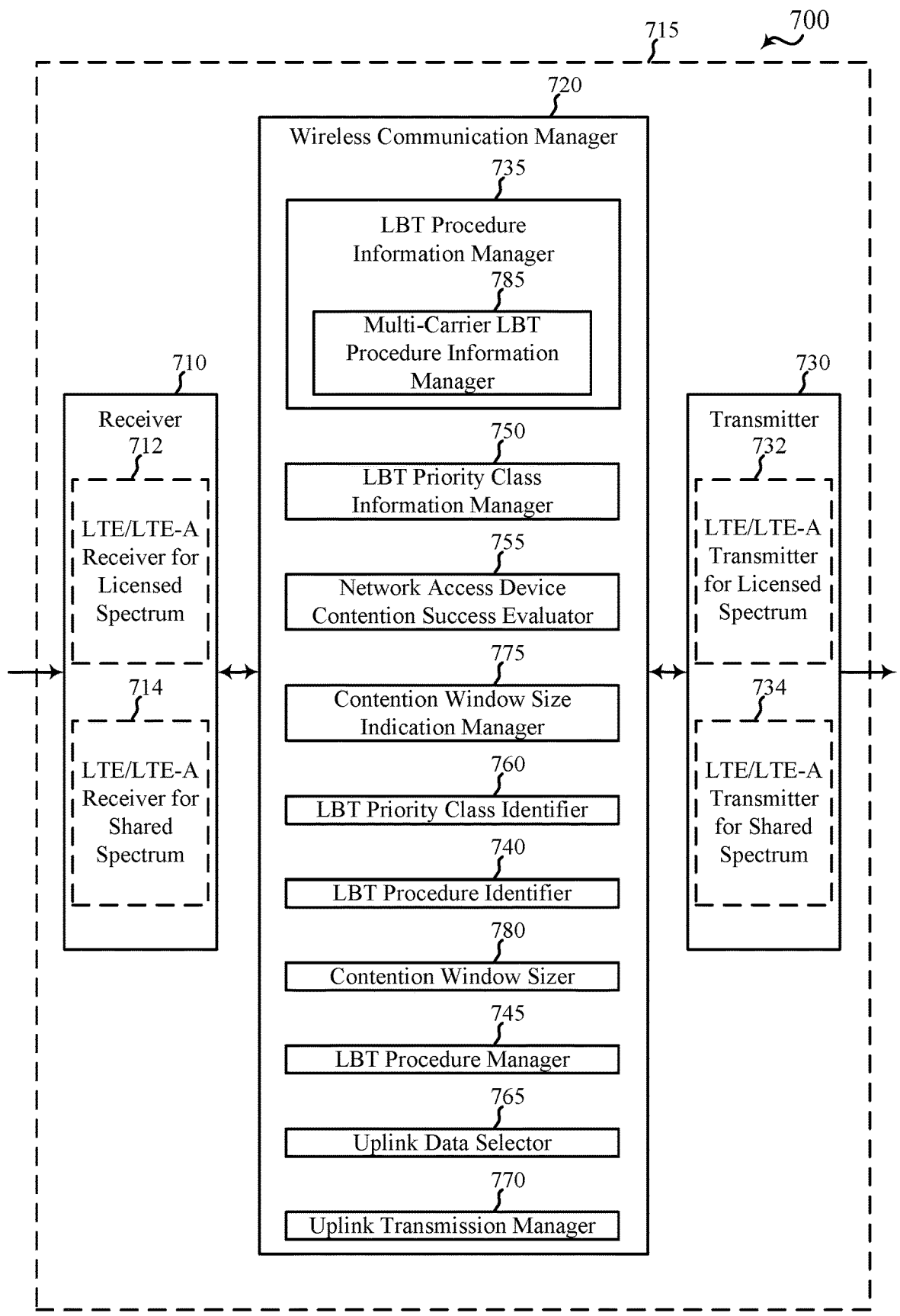
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115, 215, 215-a, or 215-b described with reference to FIG. 1 or 2, or aspects of the apparatus 615 described with reference to FIG. 6. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a licensed spectrum (e.g., a radio frequency spectrum licensed to particular users for particular uses) or a shared spectrum (e.g., an unlicensed spectrum, a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the shared spectrum may be used for LTE/LTE-A communications, as described, for example, with reference to FIG. 1, 2, 3, 4, or 5. The receiver 710 may in some cases include separate receivers for the licensed spectrum and the shared spectrum. The separate receivers may, in some examples, take the form of an LTE/LTE-A receiver for communicating over the licensed spectrum (e.g., LTE/LTE-A receiver for licensed spectrum 712), and an LTE/LTE-A receiver for communicating over the shared spectrum (e.g., LTE/LTE-A receiver for unlicensed spectrum 714). The receiver 710, including the LTE/LTE-A receiver for licensed spectrum 712 or the LTE/LTE-A receiver for unlicensed spectrum 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the transmitter 730 may include at least one RF transmitter, such as at least one RF transmitter operable to transmit over the licensed spectrum or the shared spectrum. The transmitter 730 may in some cases include separate transmitters for the licensed spectrum and the shared spectrum. The separate transmitters may, in some examples, take the form of an LTE/LTE-A transmitter for communicating over the licensed spectrum (e.g., LTE/LTE-A transmitter for licensed spectrum 732), and an LTE/LTE-A transmitter for communicating over the shared spectrum (e.g., LTE/LTE-A transmitter for shared spectrum 734). The transmitter 730, including the LTE/LTE-A transmitter for licensed spectrum 732 or the LTE/LTE-A transmitter for shared spectrum 734, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include a LBT procedure information manager 735, a LBT priority class information manager 750, a network access device contention success evaluator 755, a contention window size indication manager 775, a LBT priority class identifier 760, a LBT procedure identifier 740, a contention window sizer 780, a LBT procedure manager 745, an uplink data selector 765, or an uplink transmission manager 770.

The LBT procedure information manager 735 may be used to receive, over the air (e.g., in the shared spectrum), information indicative of at least one type of LBT procedure to perform for an uplink transmission. In some examples, the LBT procedure information manager 735 may include a multi-carrier LBT procedure information manager 785. The multi-carrier LBT procedure information manager 785 may be used to receive an indication of at least one type of multi-carrier LBT procedure to perform for the uplink transmission. In some examples, the information indicative of the at least one type of LBT procedure to perform for the uplink transmission may include at least one bit received in an uplink grant received (by the wireless communication manager 720) for the uplink transmission. In some examples, the information indicative of the at least one type of LBT procedure to perform for the uplink transmission may be signaled in a common PDCCH received by the wireless communication manager 720. In some examples, the indication of the type of multi-carrier LBT procedure to perform may be received in RRC signaling.

In some examples, the information indicative of the at least one type of LBT procedure to perform for the uplink transmission may indicate at least one of: whether a duration of the uplink transmission is within a maximum channel occupancy time for which a shared spectrum is reserved by a network access device, or a type of LBT procedure to perform prior to transmitting the uplink transmission, or a combination thereof. In these examples, the information may include at least one bit received in an uplink grant.

In some examples, the information indicative of the at least one type of LBT procedure to perform for the uplink transmission may indicate a duration of a portion of a maximum channel occupancy time for which the shared spectrum is reserved by a network access device and available for uplink transmissions. In these examples, the information indicative of the at least one type of LBT procedure to perform for the uplink transmission may be signaled in a common PDCCH.

In some examples, the type of multi-carrier LBT procedure to perform may include: a type of LBT procedure performed for a UE-selected primary carrier in a shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

The LBT priority class information manager 750 may be used to receive at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof. In some examples, the at least one indication of the at least one LBT priority class may be received in an uplink grant (e.g., a same uplink grant as the information indicative of the at least one type of LBT procedure to perform for the uplink transmission). In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission.

The network access device contention success evaluator 755 may be used to determine whether the network access device successfully contended for access to the shared spectrum.

The contention window size indication manager 775 may be used to receive at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of a contention window size for a LBT priority class and a default contention window size. In some examples, the at least one indication of a contention window size to use for at least one LBT priority class may be received in an uplink grant (e.g., a same uplink grant as the information indicative of the at least one type of LBT procedure to perform for the uplink transmission).

The LBT priority class identifier 760 may be used to identify a LBT priority class in the at least one LBT priority class for performing a LBT procedure for the uplink transmission. In some examples, the LBT priority class identifier 760 may be used to select a LBT priority class for performing a LBT procedure (e.g., a CAT 4 LBT procedure) for the shared spectrum.

The LBT procedure identifier 740 may be used to identify, from the received information, the at least one type of LBT procedure to perform for the uplink transmission. In some examples, a type of LBT procedure (e.g., a CAT 4 LBT procedure) may also be identified based at least in part on the LBT priority class selected by the LBT priority class identifier 760. When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

In some examples, the LBT procedure identifier 740 may determine whether to perform a LBT procedure (e.g., a CAT 4 LBT procedure) for the uplink transmission based at least in part on the first LBT priority class or the second LBT priority class received by the LBT priority class information manager 750. The determination of whether the LBT procedure is based at least in part on the first LBT priority class or the second LBT priority class may be based at least in part on the determination made by the network access device contention success evaluator 755 and/or a LBT priority class identified by the LBT priority class identifier 760. In some examples, the LBT procedure may be based at least in part on the first LBT priority class when it is determined that the network access device successfully contended for access to the shared spectrum, and the LBT procedure may be based at least in part on the second LBT priority class when it is determined that the network access device did not successfully contend for access to the shared spectrum. In some examples, the LBT procedure identifier 740 may be used to identify, from the received information, the type of multicarrier LBT procedure to perform for the uplink transmission.

The contention window sizer 780 may be used to size a contention window for the LBT procedure based at least in part on the selected LBT priority class. The contention window may be sized based at least in part on an indication of a contention window size corresponding to the selected LBT priority class.

The LBT procedure manager 745 may be used to include performing, for a shared spectrum, the at least one type of LBT procedure for the uplink transmission. In some examples, the at least one type of LBT procedure may include a type of multi-carrier LBT procedure.

The uplink data selector 765 may be used to select data for transmission during the uplink transmission based at least in part on an identified LBT priority class.

The uplink transmission manager 770 may be used to transmit the data selected by the uplink data selector 765.

Figure 8:
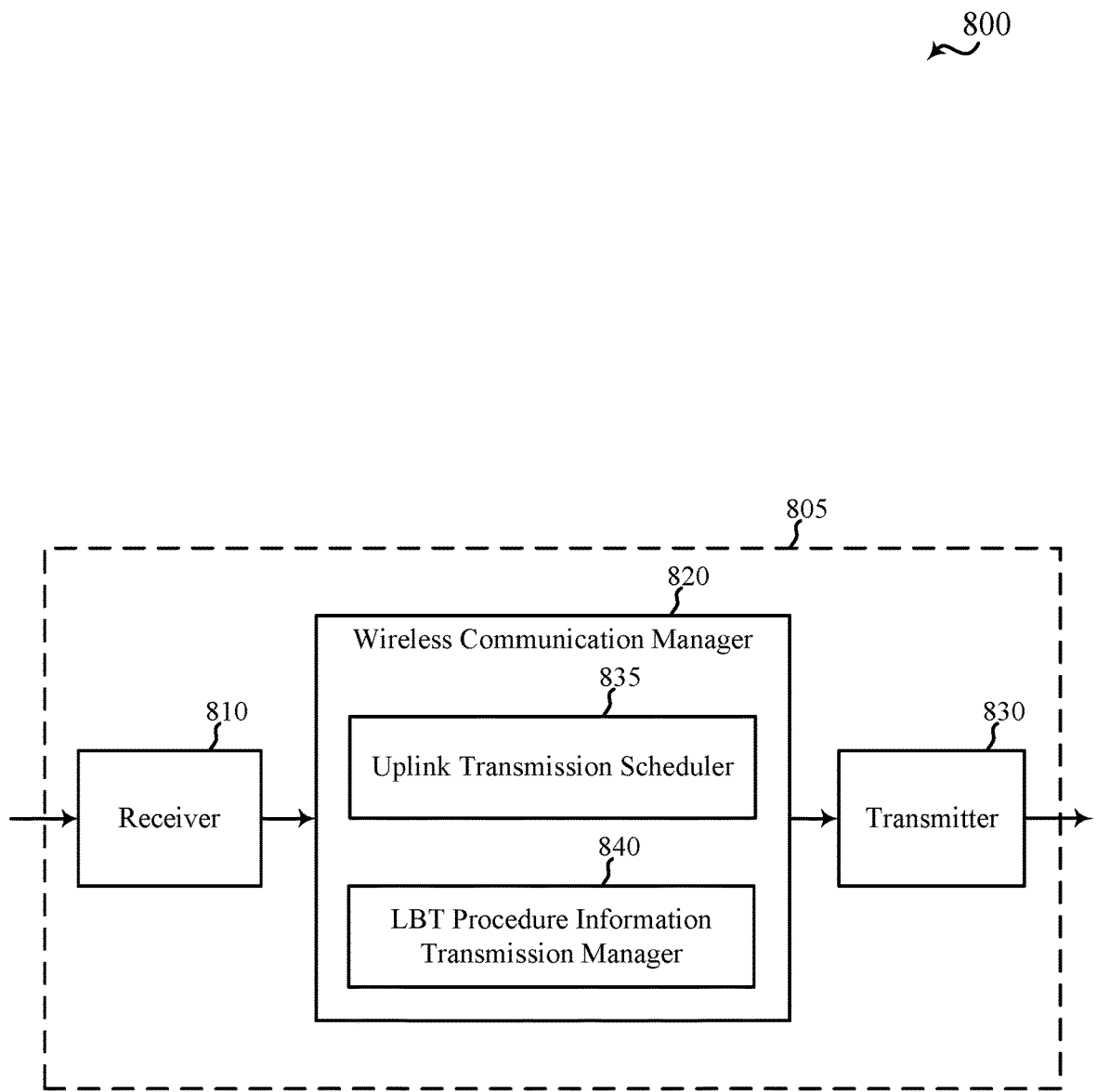
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations 105, 205, or 205-*a* described with reference to FIG. 1 or 2. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over a licensed spectrum (e.g., a radio frequency spectrum licensed to particular users for particular uses) or a shared spectrum (e.g., an unlicensed spectrum, a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the shared spectrum may be used for LTE/LTE-A communications, as described, for example, with reference to FIG. 1, 2, 3, 4, or 5. The receiver 810 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the transmitter 830 may include at least one RF transmitter, such as at least one RF transmitter operable to transmit over the licensed spectrum or the shared spectrum. The transmitter 830 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the wireless communication manager 820 may be used to manage one or more aspects of wireless communication for the apparatus 805. In some examples, part of the wireless communication manager 820 may be incorporated into or shared with the receiver 810 or the transmitter 830. In some examples, the wireless communication manager 820 may include an uplink transmission scheduler 835 or a LBT procedure information transmission manager 840.

The uplink transmission scheduler 835 may be used to schedule an uplink transmission of a UE in a shared spectrum. In some examples, scheduling the uplink transmission may include transmitting an uplink grant to the UE for the uplink transmission.

The LBT procedure information transmission manager 840 may be used to transmit, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the information indicative of the at least one type of LBT procedure to perform for the uplink transmission may be signaled in a common PDCCH transmitted by the wireless communication manager 820.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

Figure 9:
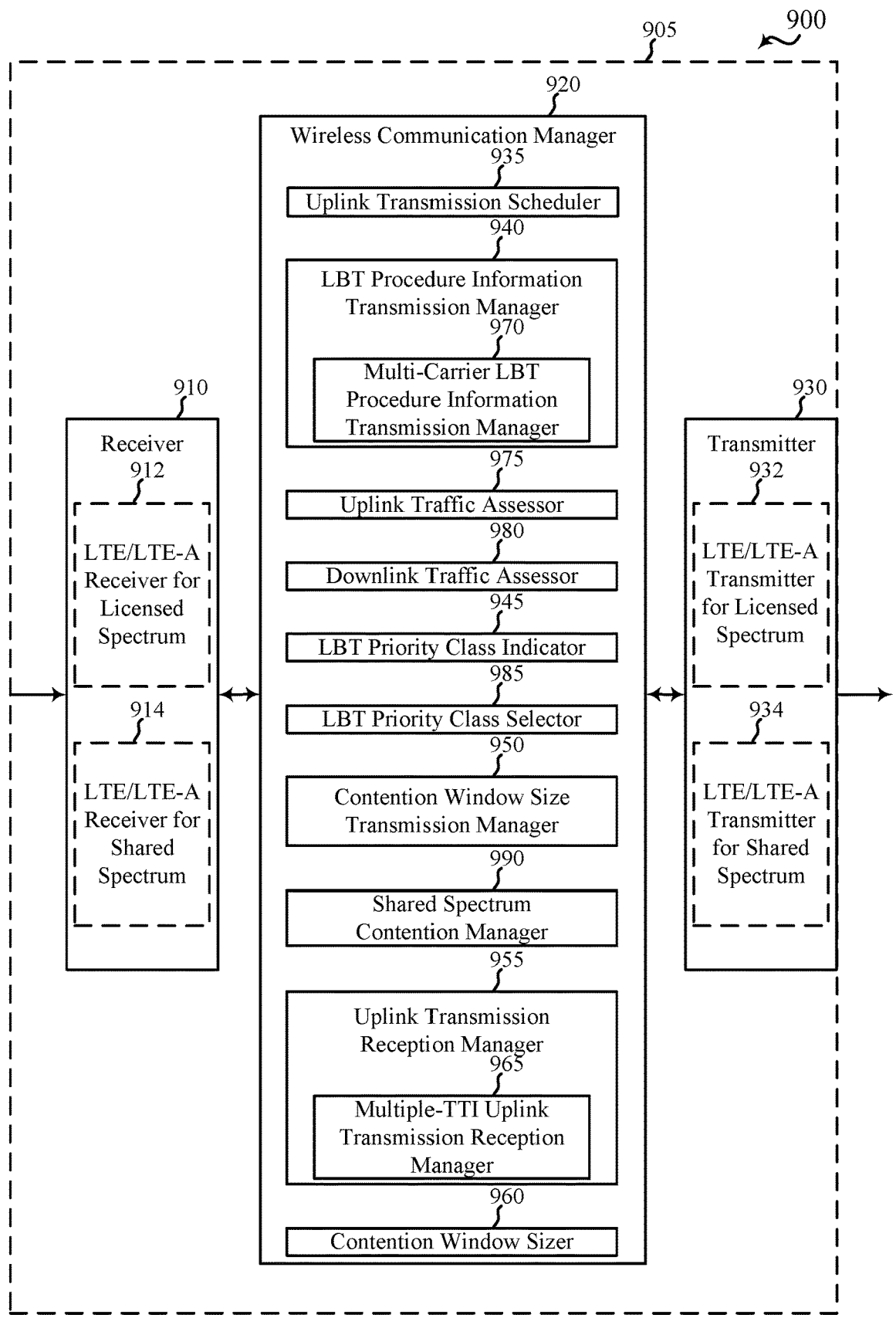
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the base stations 105, 205, or 205-a described with reference to FIG. 1 or 2, or aspects of the apparatus 805 described with reference to FIG. 8. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a licensed spectrum (e.g., a radio frequency spectrum licensed to particular users for particular uses) or a shared spectrum (e.g., an unlicensed spectrum, a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the shared spectrum may be used for LTE/LTE-A communications, as described, for example, with reference to FIG. 1, 2, 3, 4, or 5. The receiver 910 may in some cases include separate receivers for the licensed spectrum and the shared spectrum. The separate receivers may, in some examples, take the form of an LTE/LTE-A receiver for communicating over the licensed spectrum (e.g., LTE/LTE-A receiver for licensed spectrum 912), and an LTE/LTE-A receiver for communicating over the shared spectrum (e.g., LTE/LTE-A receiver for shared spectrum 914). The receiver 910, including the LTE/LTE-A receiver for licensed spectrum 912 or the LTE/LTE-A receiver for shared spectrum 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the transmitter 930 may include at least one RF transmitter, such as at least one RF transmitter operable to transmit over the licensed spectrum or the shared spectrum. The transmitter 930 may in some cases include separate transmitters for the licensed spectrum and the shared spectrum. The separate transmitters may, in some examples, take the form of an LTE/LTE-A transmitter for communicating over the licensed spectrum (e.g., LTE/LTE-A transmitter for licensed spectrum 932), and an LTE/LTE-A transmitter for communicating over the shared spectrum (e.g., LTE/LTE-A transmitter for shared spectrum 934). The transmitter 930, including the LTE/LTE-A transmitter for licensed spectrum 932 or the LTE/LTE-A transmitter for shared spectrum 934, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the wireless communication manager 920 may be used to manage one or more aspects of wireless communication for the apparatus 905. In some examples, part of the wireless communication manager 920 may be incorporated into or shared with the receiver 910 or the transmitter 930. In some examples, the wireless communication manager 920 may include an uplink transmission scheduler 935, a LBT procedure information transmission manager 940, an uplink traffic assessor 975, a downlink traffic assessor 980, a LBT priority class indicator 945, a LBT priority class selector 985, a contention window size transmission manager 950, a shared spectrum contention manager 990, an uplink transmission reception manager 955, or a contention window sizer 960.

The uplink transmission scheduler 935 may be used to schedule an uplink transmission of a UE in a shared spectrum. In some examples, the uplink transmission may include a multiple-TTI uplink transmission or a multi-carrier uplink transmission. In some examples, scheduling the uplink transmission may include transmitting an uplink grant to the UE for the uplink transmission.

The LBT procedure information transmission manager 940 may be used to transmit, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the information indicative of the at least one type of LBT procedure to perform for the uplink transmission may be signaled in a common PDCCH transmitted by the wireless communication manager 920. In some examples, the LBT procedure information transmission manager 940 may include a multi-carrier LBT procedure information transmission manager 970. The multi-carrier LBT procedure information transmission manager 970 may be used to transmit an indication of a type of multi-carrier LBT procedure to perform for the multi-carrier uplink transmission. In some examples, the indication of the type of multi-carrier LBT procedure to perform may be transmitted in RRC signaling. In some examples, the indication may be transmitted prior to transmission of the uplink grant used to schedule the multi-carrier uplink transmission.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

In some examples, the type of multi-carrier LBT procedure to perform may include: a type of LBT procedure performed for a UE-selected primary carrier in the shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

The uplink traffic assessor 975 may be used to determine, based at least in part on a BSR associated with a UE, an amount of uplink traffic of the UE associated with each LBT priority class of a plurality of LBT priority classes.

The downlink traffic assessor 980 may be used to determine, for a UE, an amount of downlink traffic associated with each LBT priority class of the plurality of LBT priority classes.

The LBT priority class indicator 945 may be used to transmit at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the at least one indication of at least one LBT priority class may be transmitted in an uplink grant (e.g., the uplink grant used to schedule the uplink transmission).

The LBT priority class selector 985 may be used to select, based at least in part on the determined amount of uplink traffic of a UE associated with each LBT priority class (determined by the uplink traffic assessor 975), a LBT priority class for performing a LBT procedure. In some examples, the LBT priority class for performing the LBT procedure may be further selected based at least in part on the determined amount of downlink traffic associated with each LBT priority class (determined by the downlink traffic assessor 980).

The contention window size transmission manager 950 may be used to transmit at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of contention window size for a LBT priority class and a default contention window size. In some examples, at least one indication of a contention window size may be signaled in an uplink grant (e.g., the uplink grant used to schedule the uplink transmission).

The shared spectrum contention manager 990 may be used to contend for access to a shared spectrum by performing the LBT procedure based at least in part on the selected LBT priority class.

The uplink transmission reception manager 955 may be used to determine whether receipt of the uplink transmission is detected. Upon not detecting receipt of the uplink transmission, the contention window sizer 960 may determine to perform a next LBT procedure to contend for access to the shared spectrum using a same contention window size as an immediately prior LBT procedure. Upon detecting receipt of the uplink transmission, the uplink transmission reception manager 955 may be used to determine whether a CRC for the uplink transmission is properly decoded. Upon properly decoding the CRC, the contention window sizer 960 may determine to perform a next LBT procedure to contend for access to the shared spectrum using a same contention window size as an immediately prior LBT procedure. Upon failing to decode the CRC, the contention window sizer 960 may determine to update (resize) a contention window size for a next LBT procedure to contend for access to the shared spectrum.

In some examples, the uplink transmission reception manager 955 may include a multiple-TTI uplink transmission reception manager 965. The multiple-TTI uplink transmission reception manager 965 may be used to detect receipt of the multiple-TTI uplink transmission during at least one TTI of the multiple-TTI uplink transmission. In some examples, the contention window sizer 960 may refrain from updating a contention window size for a next LBT procedure to contend for access to the shared spectrum based at least in part on detecting receipt of the multiple-TTI uplink transmission during the at least one TTI of the multiple-TTI uplink transmission. In some examples, the refraining from updating the contention window size for the next LBT procedure may be further based at least in part on not detecting a LBT gap on the shared spectrum during the multiple TTIs of the multiple-TTI transmission.

Figure 10:
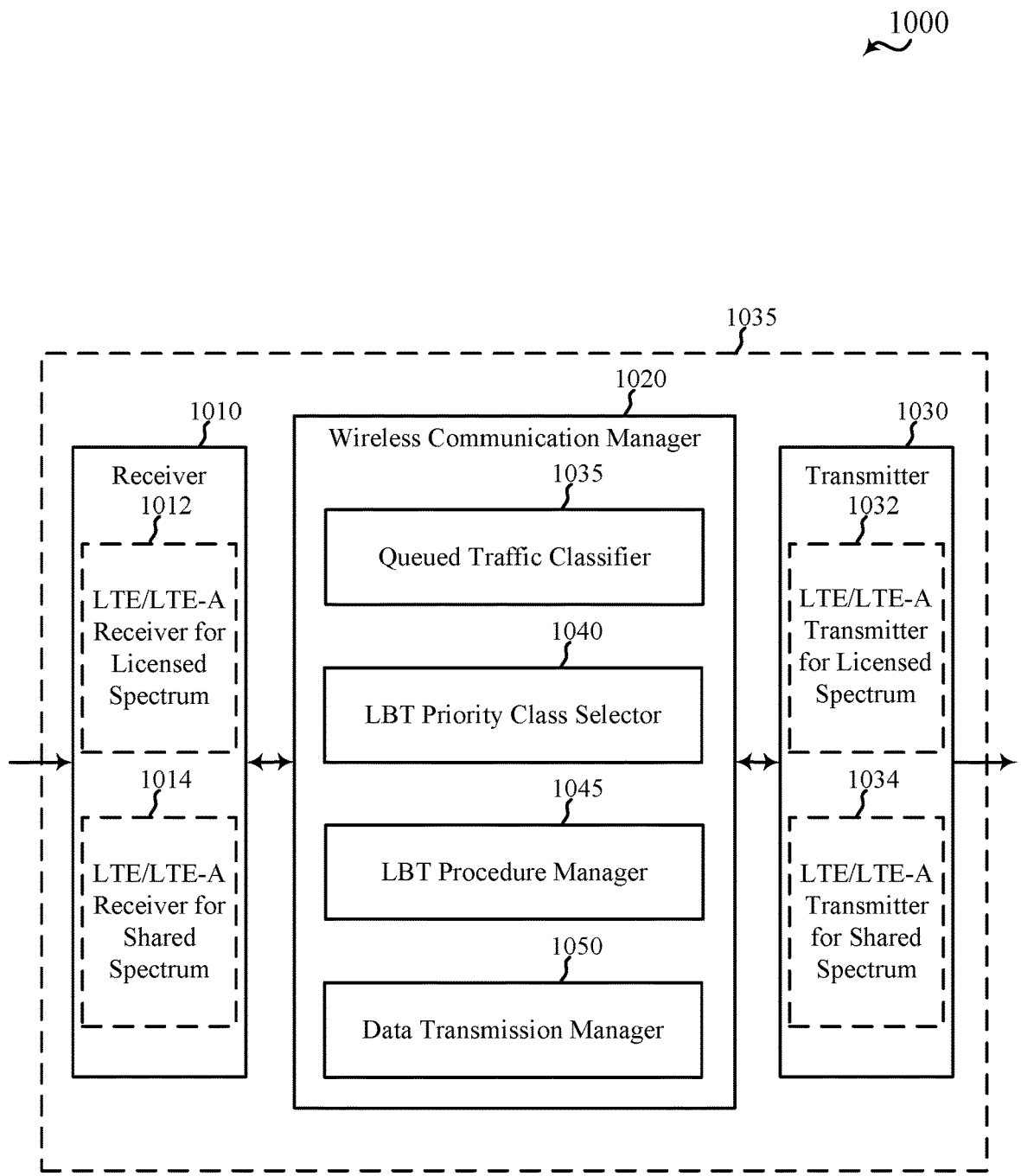
FIG. 10 shows a block diagram of an apparatus for use in wireless communication, in accordance with various aspects of the present disclosure.

FIG. 10 shows a block diagram 1000 of an apparatus 1035 for use in wireless communication, in accordance with various aspects of the present disclosure. The apparatus 1035 may be an example of aspects of one or more of the UEs 115, 215, 215-*a*, or 215-*b* described with reference to FIG. 1 or 2, aspects of one or more of the base stations 105, 205, or 205-*a* described with reference to FIG. 1 or 2, or aspects of one or more of the apparatuses 615, 715, 805, or 905 described with reference to FIG. 6, 7, 8, or 9. The apparatus 1035 may also be or include a processor. The apparatus 1035 may include a receiver 1010, a wireless communication manager 1020, or a transmitter 1030. Each of these components may be in communication with each other.

The components of the apparatus 1035 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one radio frequency (RF) receiver, such as at least one RF receiver operable to receive transmissions over a licensed spectrum (e.g., a radio frequency spectrum licensed to particular users for particular uses) or a shared spectrum (e.g., an unlicensed spectrum, a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the shared spectrum may be used for LTE/LTE-A communications, as described, for example, with reference to FIG. 1, 2, 3, 4, or 5. The receiver 1010 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the transmitter 1030 may include at least one RF transmitter, such as at least one RF transmitter operable to transmit over the licensed spectrum or the shared spectrum. The transmitter 1030 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the shared spectrum.

In some examples, the wireless communication manager 1020 may be used to manage one or more aspects of wireless communication for the apparatus 1035. In some examples, part of the wireless communication manager 1020 may be incorporated into or shared with the receiver 1010 or the transmitter 1030. In some examples, the wireless communication manager 1020 may include a queued traffic classifier 1040, a LBT priority class selector 1045, a LBT procedure manager 1050, or a data transmission manager 1055.

The queued traffic classifier 1040 may be used to determine an amount of queued traffic associated with each LBT priority class of a plurality of LBT priority classes. The LBT priority class selector 1045 may be used to select a LBT priority class for performing a LBT procedure. The LBT procedure manager 1050 may be used to perform the LBT procedure based at least in part on the selected LBT priority class to contend for access to a shared spectrum. The data transmission manager 1055 may be used to transmit, upon winning contention for access to the shared spectrum, at least some of the queued traffic associated with a lower LBT priority class than the selected LBT priority class.

Figure 11:
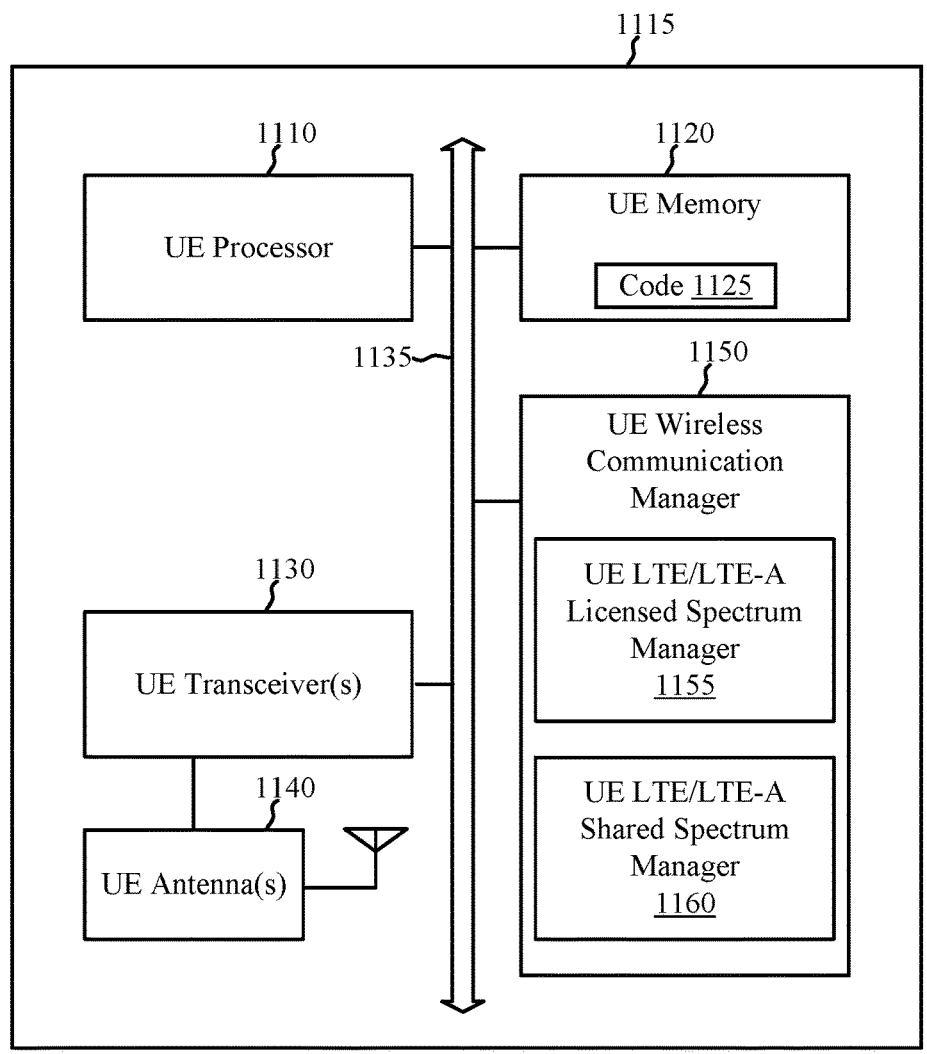
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 215-*a*, or 215-*b* described with reference to FIG. 1 or 2, or aspects of one or more of the apparatuses 615, 715, or 1015 described with reference to FIG. 6, 7, or 10. The UE 1115 may be configured to implement at least some of the UE or apparatus techniques and functions described with reference to FIG. 1, 2, 3, 4, 5, 6, 7, or 10.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include random access memory (RAM) or read-only memory (ROM). The UE memory 1120 may store computer-readable, computer-executable code 1125 containing instructions that are configured to, when executed, cause the UE processor 1110 to perform various functions described herein related to wireless communication, including, for example, performing at least one type of LBT procedure for an uplink transmission in a shared spectrum, in accordance with information or signaling received from a network access device. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a central processing unit (CPU), a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a licensed spectrum or a shared spectrum. The licensed spectrum may include a radio frequency spectrum licensed to particular users for particular uses. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the licensed spectrum or the shared spectrum. The UE transceiver(s) 1130 may be configured to communicate bi-directionally, via the UE antenna(s) 1140, with one or more network access devices (e.g., base stations) or apparatuses, such as one or more of the base stations 105, 205, or 205-*a* described with reference to FIG. 1 or 2, or one or more of the apparatuses 805, 905, or 1005 described with reference to FIG. 8, 9, or 10. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 6, 7, or 10 related to wireless communication over the licensed spectrum or the shared spectrum. For example, the UE wireless communication manager 1150 may be configured to support a supplemental downlink mode (e.g., a licensed assisted access mode), a carrier aggregation mode, or a standalone mode using the licensed spectrum or the shared spectrum. The UE wireless communication manager 1150 may include a UE LTE/LTE-A licensed spectrum manager 1155 configured to handle LTE/LTE-A communications in the licensed spectrum, and a UE LTE/LTE-A shared spectrum manager 1160 configured to handle LTE/LTE-A communications in the shared spectrum. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager 620, 720, or 1020 described with reference to FIG. 6, 7, or 10.

Figure 12:
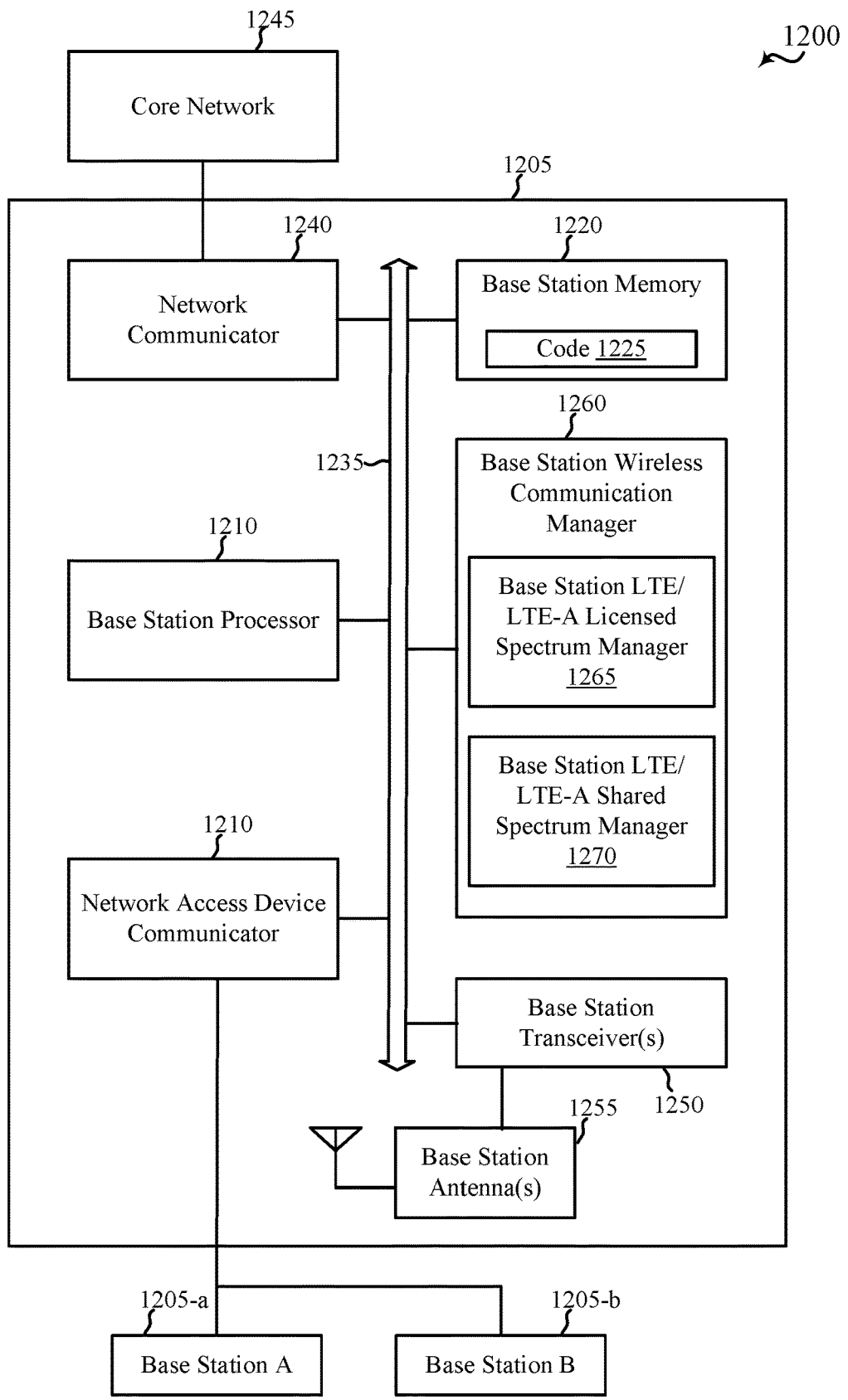
FIG. 12 shows a block diagram of a base station for use in wireless communication, in accordance with various aspects of the present disclosure.

FIG. 12 shows a block diagram 1200 of a base station 1205 for use in wireless communication, in accordance with various aspects of the present disclosure. In some examples, the base station 1205 may be an example of one or more aspects of the base stations 105, 205, or 205-a described with reference to FIG. 1 or 2, or aspects of one or more of the apparatuses 805, 905, or 1005 described with reference to FIG. 8, 9, or 10. The base station 1205 may be configured to implement or facilitate at least some of the base station or base station techniques and functions described with reference to FIG. 1, 2, 3, 4, 5, 8, 9, or 10.

The base station 1205 may include a base station processor 1210, a base station memory 1220, at least one base station transceiver (represented by base station transceiver(s) 1250), at least one base station antenna (represented by base station antenna(s) 1255), or a base station wireless communication manager 1260. The base station 1205 may also include one or more of a network access device communicator 1230 or a network communicator 1240. Each of these components may be in communication with each other, directly or indirectly, over one or more buses 1235.

The base station memory 1220 may include RAM or ROM. The base station memory 1220 may store computer-readable, computer-executable code 1225 containing instructions that are configured to, when executed, cause the base station processor 1210 to perform various functions described herein related to wireless communication, including, for example, scheduling uplink transmissions in a shared spectrum, and transmitting information or signaling usable by UEs to identify at least one type of LBT procedure to perform for an uplink transmission. Alternatively, the computer-executable code 1225 may not be directly executable by the base station processor 1210 but be configured to cause the base station 1205 (e.g., when compiled and executed) to perform various of the functions described herein.

The base station processor 1210 may include an intelligent hardware device, e.g., a CPU, a microcontroller, an ASIC, etc. The base station processor 1210 may process information received through the base station transceiver(s) 1250, the network access device communicator 1230, or the network communicator 1240. The base station processor 1210 may also process information to be sent to the transceiver(s) 1250 for transmission through the antenna(s) 1255, to the network access device communicator 1230, for transmission to one or more other network access devices (e.g., base station 1205-a and/or base station 1205-b), or to the network communicator 1240 for transmission to a core network 1245, which may be an example of one or more aspects of the core network 130 described with reference to FIG. 1. The base station processor 1210 may handle, alone or in connection with the base station wireless communication manager 1260, various aspects of communicating over (or managing communications over) a licensed spectrum or a shared spectrum. The licensed spectrum may include a radio frequency spectrum licensed to particular users for particular uses. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more base station transmitters and one or more separate base station receivers. The base station transceiver(s) 1250 may support communications in the licensed spectrum or the shared spectrum. The base station transceiver(s) 1250 may be configured to communicate bi-directionally, via the base station antenna(s) 1255, with one or more UEs or apparatuses, such as one or more of the UEs 115, 215, 215-a, 215-b, or 1115 described with reference to FIG. 1, 2, or 11, or one or more of the apparatuses 605, 705, or 1005 described with reference to FIG. 6, 7, or 10. The base station 1205 may, for example, include multiple base station antennas 1255 (e.g., an antenna array). The base station 1205 may communicate with the core network 1245 through the network communicator 1240. The base station 1205 may also communicate with other network access devices, such as the base station 1205-a and/or the base station 1205-b, using the network access device communicator 1230.

The base station wireless communication manager 1260 may be configured to perform or control some or all of the techniques or functions described with reference to FIG. 1, 2, 3, 4, 5, 8, 9, or 10 related to wireless communication over the licensed spectrum or the shared spectrum. For example, the base station wireless communication manager 1260 may be configured to support a supplemental downlink mode (e.g., a licensed assisted access mode), a carrier aggregation mode, or a standalone mode using the licensed spectrum or the shared spectrum. The base station wireless communication manager 1260 may include a base station LTE/LTE-A licensed spectrum manager 1265 configured to handle LTE/LTE-A communications in the licensed spectrum, and a base station LTE/LTE-A unlicensed spectrum manager 1270 configured to handle LTE/LTE-A communications in the shared spectrum. The base station wireless communication manager 1260, or portions of it, may include a processor, or some or all of the functions of the base station wireless communication manager 1260 may be performed by the base station processor 1210 or in connection with the base station processor 1210. In some examples, the base station wireless communication manager 1260 may be an example of the wireless communication manager 820, 920, or 1020 described with reference to FIG. 8, 9, or 10.

Figure 13:
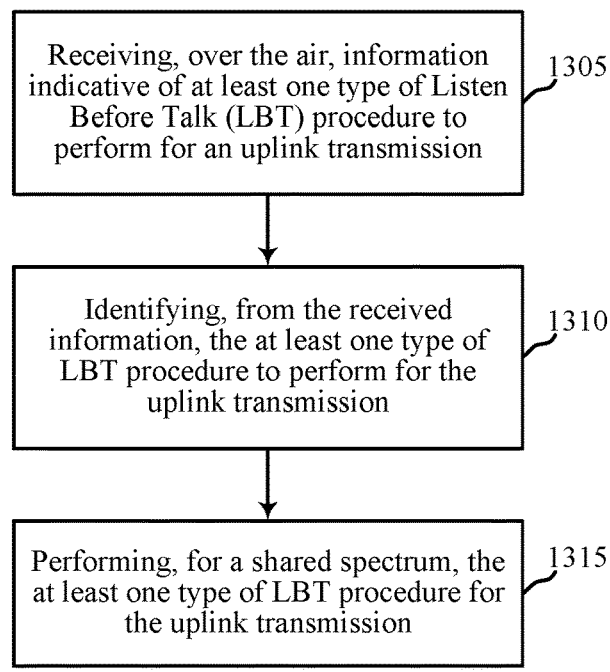
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 215-a, 215-b, or 1115 described with reference to FIG. 1, 2, or 11, or aspects of one or more of the apparatuses 615 or 715 described with reference to FIG. 6 or 7. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving, over the air (e.g., in the shared spectrum), information indicative of at least one type of LBT procedure to perform for an uplink transmission. In some examples, the method 1300 may include receiving an uplink grant for the uplink transmission, and the information indicative of the at least one type of LBT procedure to perform for the uplink transmission may include at least one bit received in the uplink grant. In some examples, the method 1300 may include receiving a common PDCCH, and the information indicative of the at least one type of LBT procedure to perform for the uplink transmission may be signaled in the common PDCCH. The operation(s) at block 1305 may be performed using the wireless communication manager 620 or 720 described with reference to FIG. 6 or 7, the UE wireless communication manager 1150 descried with reference to FIG. 11, or the LBT procedure information manager 635 or 735 described with reference to FIG. 6 or 7.

In some examples, the information indicative of the at least one type of LBT procedure to perform for the uplink transmission may indicate at least one of: whether a duration of the uplink transmission is within a maximum channel occupancy time for which a shared spectrum is reserved by a network access device, or a type of LBT procedure to perform prior to transmitting the uplink transmission, or a combination thereof. In these examples, the information may include at least one bit received in an uplink grant. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

In some examples, the information indicative of the at least one type of LBT procedure to perform for the uplink transmission may indicate a duration of a portion of a maximum channel occupancy time for which the shared spectrum is reserved by a network access device and available for uplink transmissions. In these examples, the information indicative of the at least one type of LBT procedure to perform for the uplink transmission may be signaled in a common PDCCH.

At block 1310, the method 1300 may include identifying, from the received information, the at least one type of LBT procedure to perform for the uplink transmission. The operation(s) at block 1310 may be performed using the wireless communication manager 620 or 720 described with reference to FIG. 6 or 7, the UE wireless communication manager 1150 descried with reference to FIG. 11, or the LBT procedure identifier 640 or 740 described with reference to FIG. 6 or 7.

When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

At block 1315, the method 1300 may include performing, for a shared spectrum, the at least one type of LBT procedure for the uplink transmission. The operation(s) at block 1315 may be performed using the wireless communication manager 620 or 720 described with reference to FIG. 6 or 7, the UE wireless communication manager 1150 descried with reference to FIG. 11, or the LBT procedure manager 645 or 745 described with reference to FIG. 6 or 7.

Thus, the method 1300 may provide for wireless communication. It should be noted that the method 1300 is just one implementation and that the operations of the method 1300 may be rearranged or otherwise modified such that other implementations are possible.

Figure 14:
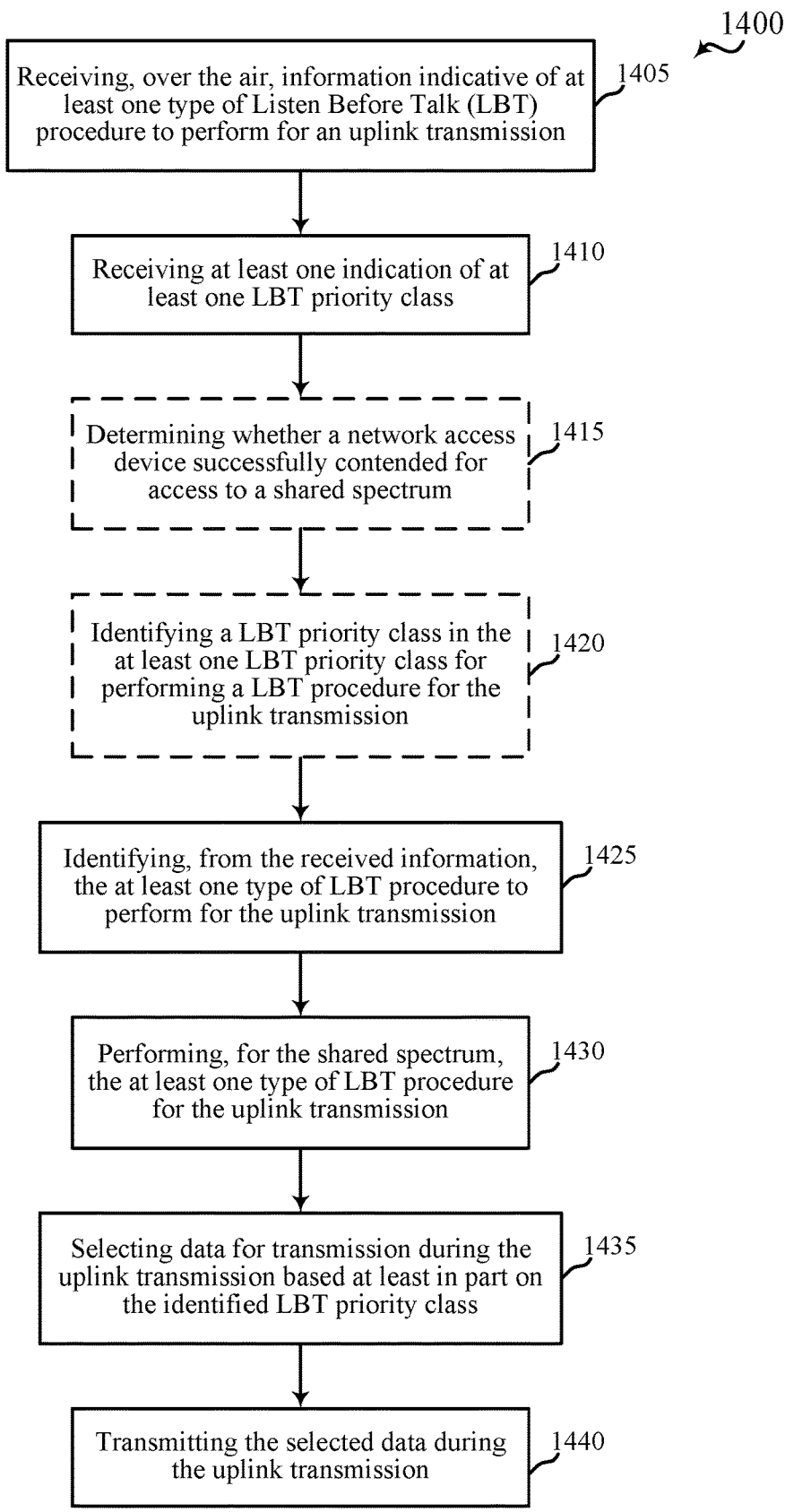
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs 115, 215, 215-*a*, 215-*b*, or 1115 described with reference to FIG. 1, 2, or 11, or aspects of one or more of the apparatuses 615 or 715 described with reference to FIG. 6 or 7. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving information indicative of at least one type of LBT procedure to perform for an uplink transmission. In some examples, the method 1400 may include receiving an uplink grant for the uplink transmission, and the information indicative of the at least one type of LBT procedure to perform for the uplink transmission may include at least one bit received in the uplink grant. In some examples, the method 1400 may include receiving a common PDCCH, and the information indicative of the at least one type of LBT procedure to perform for the uplink transmission may be signaled in the common PDCCH. The operation(s) at block 1405 may be performed using the wireless communication manager 620 or 720 described with reference to FIG. 6 or 7, the UE wireless communication manager 1150 descried with reference to FIG. 11, or the LBT procedure information manager 635 or 735 described with reference to FIG. 6 or 7.

In some examples, the information indicative of the at least one type of LBT procedure to perform for the uplink transmission may indicate at least one of: whether a duration of the uplink transmission is within a maximum channel occupancy time for which a shared spectrum is reserved by a network access device, or a type of LBT procedure to perform prior to transmitting the uplink transmission, or a combination thereof. In these examples, the information may include at least one bit received in an uplink grant. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

In some examples, the information indicative of the at least one type of LBT procedure to perform for the uplink transmission may indicate a duration of a portion of a maximum channel occupancy time for which the shared spectrum is reserved by a network access device and available for uplink transmissions. In these examples, the information indicative of the at least one type of LBT procedure to perform for the uplink transmission may be signaled in a common PDCCH.

At block 1410, the method 1400 may include receiving, over the air (e.g., in the shared spectrum), at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof. In some examples, the at least one indication of the at least one LBT priority class may be received in an uplink grant (e.g., a same uplink grant as the information indicative of the at least one type of LBT procedure to perform for the uplink transmission). The operation(s) at block 1410 may be performed using the wireless communication manager 620 or 720 described with reference to FIG. 6 or 7, the UE wireless communication manager 1150 descried with reference to FIG. 11, or the LBT priority class information manager 750 described with reference to FIG. 7.

In some examples, the first LBT priority class received at block 1410 may be associated with the network access device performing a LBT procedure to contend for access to: at least a first carrier of the shared spectrum on which the uplink transmission is scheduled, or at least a second carrier of the shared spectrum used to cross-carrier schedule the uplink transmission.

At block 1415, the method 1400 may optionally include determining whether the network access device successfully contended for access to the shared spectrum. The operation(s) at block 1415 may be performed using the wireless communication manager 620 or 720 described with reference to FIG. 6 or 7, the UE wireless communication manager 1150 descried with reference to FIG. 11, or the network access device contention success evaluator 755 described with reference to FIG. 7.

At block 1420, the method 1400 may optionally include identifying a LBT priority class in the at least one LBT priority class for performing a LBT procedure for the uplink transmission. The operation(s) at block 1420 may be performed using the wireless communication manager 620 or 720 described with reference to FIG. 6 or 7, the UE wireless communication manager 1150 descried with reference to FIG. 11, or the LBT priority class identifier 760 described with reference to FIG. 7.

At block 1425, the method 1400 may include identifying, from the received information, the at least one type of LBT procedure to perform for the uplink transmission. The operation(s) at block 1425 may be performed using the wireless communication manager 620 or 720 described with reference to FIG. 6 or 7, the UE wireless communication manager 1150 descried with reference to FIG. 11, or the LBT procedure identifier 640 or 740 described with reference to FIG. 6 or 7.

When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

In some examples, the operations at block 1425 may include determining whether to perform a LBT procedure (e.g., a CAT 4 LBT procedure) for the uplink transmission based at least in part on the first LBT priority class or the second LBT priority class. The determination of whether the LBT procedure is based at least in part on the first LBT priority class or the second LBT priority class may be based at least in part on the determination made at block 1415. In some examples, the LBT procedure may be based at least in part on the first LBT priority class when it is determined that the network access device successfully contended for access to the shared spectrum, and the LBT procedure may be based at least in part on the second LBT priority class when it is determined that the network access device did not successfully contend for access to the shared spectrum.

At block 1430, the method 1400 may include performing, for the shared spectrum, the at least one type of LBT procedure for the uplink transmission. The operation(s) at block 1415 may be performed using the wireless communication manager 620 or 720 described with reference to FIG. 6 or 7, the UE wireless communication manager 1150 descried with reference to FIG. 11, or the LBT procedure manager 645 or 745 described with reference to FIG. 6 or 7.

At block 1435, the method 1400 may optionally include selecting data for transmission during the uplink transmission based at least in part on the identified LBT priority class. The operation(s) at block 1435 may be performed using the wireless communication manager 620 or 720 described with reference to FIG. 6 or 7, the UE wireless communication manager 1150 descried with reference to FIG. 11, or the uplink data selector 765 described with reference to FIG. 7.

At block 1440, the method 1400 may optionally include transmitting the data selected at block 1435 during the uplink transmission. The operation(s) at block 1435 and/or 340 may depend on successful performance of the LBT procedure at block 1430. The operation(s) at block 1440 may be performed using the wireless communication manager 620 or 720 described with reference to FIG. 6 or 7, the UE wireless communication manager 1150 descried with reference to FIG. 11, or the uplink transmission manager 770 described with reference to FIG. 7.

Thus, the method 1400 may provide for wireless communication. It should be noted that the method 1400 is just one implementation and that the operations of the method 1400 may be rearranged or otherwise modified such that other implementations are possible.

Figure 15:
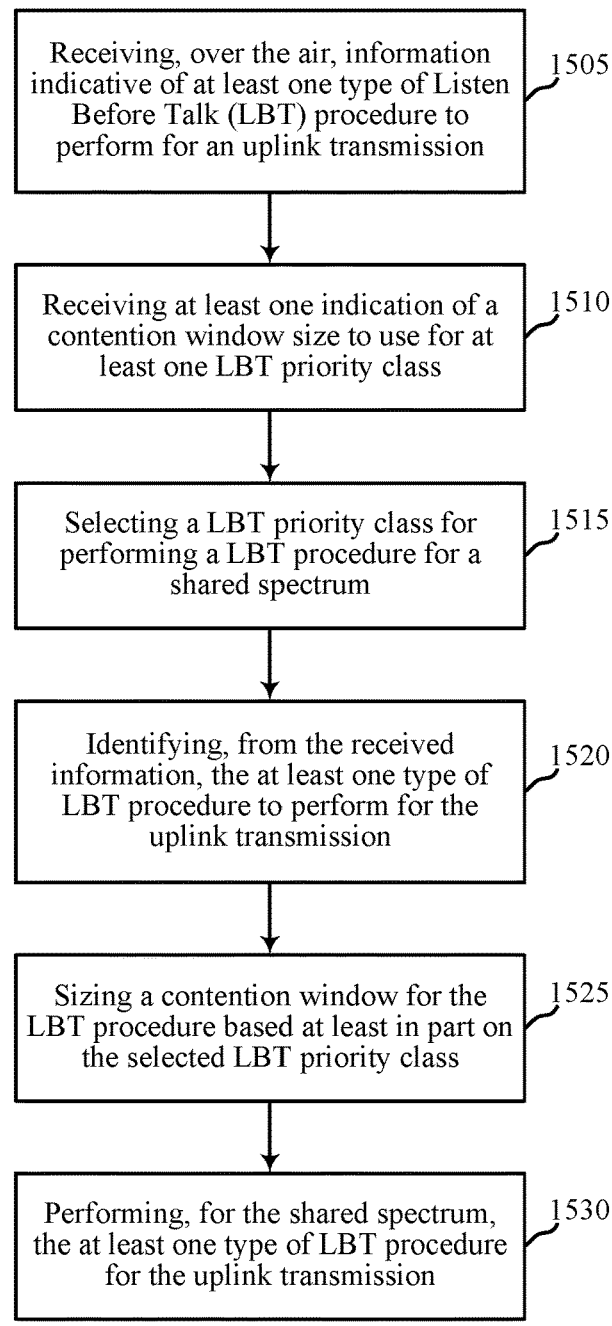
FIG. 15 is a flow chart illustrating an example of a method for wireless communication at a UE, in accordance with various aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs 115, 215, 215-a, 215-b, or 1115 described with reference to FIG. 1, 2, or 11, or aspects of one or more of the apparatuses 615 or 715 described with reference to FIG. 6 or 7. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving information indicative of at least one type of LBT procedure to perform for an uplink transmission. In some examples, the method 1500 may include receiving an uplink grant for the uplink transmission, and the information indicative of the at least one type of LBT procedure to perform for the uplink transmission may include at least one bit received in the uplink grant. In some examples, the method 1500 may include receiving a common PDCCH, and the information indicative of the at least one type of LBT procedure to perform for the uplink transmission may be signaled in the common PDCCH. The operation(s) at block 1505 may be performed using the wireless communication manager 620 or 720 described with reference to FIG. 6 or 7, the UE wireless communication manager 1150 descried with reference to FIG. 11, or the LBT procedure information manager 635 or 735 described with reference to FIG. 6 or 7.

In some examples, the information indicative of the at least one type of LBT procedure to perform for the uplink transmission may indicate at least one of: whether a duration of the uplink transmission is within a maximum channel occupancy time for which a shared spectrum is reserved by a network access device, or a type of LBT procedure to perform prior to transmitting the uplink transmission, or a combination thereof. In these examples, the information may include at least one bit received in an uplink grant. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

In some examples, the information indicative of the at least one type of LBT procedure to perform for the uplink transmission may indicate a duration of a portion of a maximum channel occupancy time for which the shared spectrum is reserved by a network access device and available for uplink transmissions. In these examples, the information indicative of the at least one type of LBT procedure to perform for the uplink transmission may be signaled in a common PDCCH.

At block 1510, the method 1500 may include receiving, over the air (e.g., in the shared spectrum), at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of a contention window size for a LBT priority class and a default contention window size. In some examples, the at least one indication of a contention window size to use for at least one LBT priority class may be received in an uplink grant (e.g., a same uplink grant as the information indicative of the at least one type of LBT procedure to perform for the uplink transmission). The operation(s) at block 1510 may be performed using the wireless communication manager 620 or 720 described with reference to FIG. 6 or 7, the UE wireless communication manager 1150 descried with reference to FIG. 11, or the contention window size indication manager 775 described with reference to FIG. 7.

At block 1515, the method 1500 may include selecting a LBT priority class for performing a LBT procedure (e.g., a CAT 4 LBT procedure) for the shared spectrum. The operation(s) at block 1515 may be performed using the wireless communication manager 620 or 720 described with reference to FIG. 6 or 7, the UE wireless communication manager 1150 descried with reference to FIG. 11, or the LBT priority class identifier 760 described with reference to FIG. 7.

At block 1520, the method 1500 may include identifying, from the received information, the at least one type of LBT procedure to perform for the uplink transmission. In some examples, a type of LBT procedure (e.g., a CAT 4 LBT procedure) may also be identified based at least in part on the LBT priority class selected at block 1515. The operation(s) at block 1520 may be performed using the wireless communication manager 620 or 720 described with reference to FIG. 6 or 7, the UE wireless communication manager 1150 descried with reference to FIG. 11, or the LBT procedure identifier 640 or 740 described with reference to FIG. 6 or 7.

When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

At block 1525, the method 1500 may include sizing a contention window for the LBT procedure based at least in part on the selected LBT priority class. The contention window may be sized based at least in part on an indication of a contention window size corresponding to the selected LBT priority class. The operation(s) at block 1525 may be performed using the wireless communication manager 620 or 720 described with reference to FIG. 6 or 7, the UE wireless communication manager 1150 descried with reference to FIG. 11, or the contention window sizer 780 described with reference to FIG. 7.

At block 1530, the method 1500 may include performing, for a shared spectrum, the at least one type of LBT procedure for the uplink transmission. The operation(s) at block 1530 may be performed using the wireless communication manager 620 or 720 described with reference to FIG. 6 or 7, the UE wireless communication manager 1150 descried with reference to FIG. 11, or the LBT procedure manager 645 or 745 described with reference to FIG. 6 or 7.

Thus, the method 1500 may provide for wireless communication. It should be noted that the method 1500 is just one implementation and that the operations of the method 1500 may be rearranged or otherwise modified such that other implementations are possible.

Figure 16:
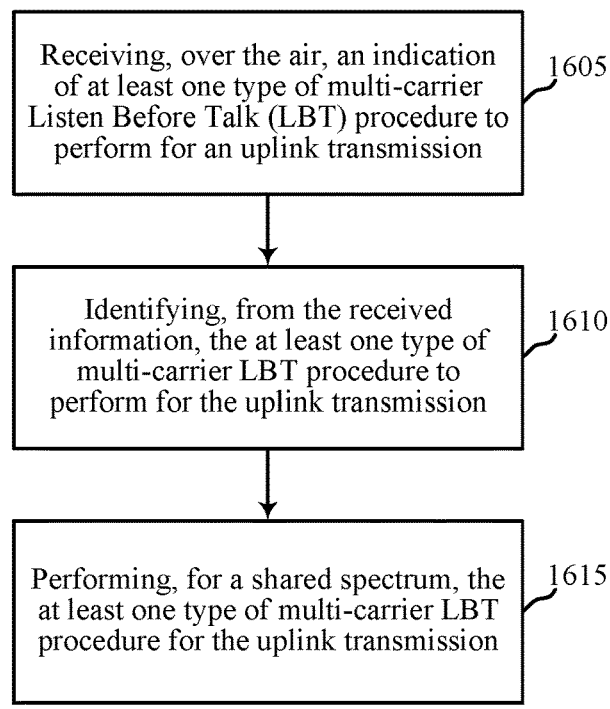
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115, 215, 215-a, 215-b, or 1115 described with reference to FIG. 1, 2, or 11, or aspects of one or more of the apparatuses 615 or 715 described with reference to FIG. 6 or 7. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving, over the air (e.g., in the shared spectrum), an indication of at least one type of multi-carrier LBT procedure to perform for an uplink transmission. In some examples, the indication of the type of multi-carrier LBT procedure to perform may be received in RRC signaling. The operation(s) at block

1605 may be performed using the wireless communication manager 620 or 720 described with reference to FIG. 6 or 7, the UE wireless communication manager 1150 descried with reference to FIG. 11, the LBT procedure information manager 635 or 735 described with reference to FIG. 6 or 7, or the multi-carrier LBT procedure information manager 785.

In some examples, the type of multi-carrier LBT procedure to perform may include: a type of LBT procedure performed for a UE-selected primary carrier in a shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner.

At block 1610, the method 1600 may include identifying, from the received information, the type of multi-carrier LBT procedure to perform for the uplink transmission. The operation(s) at block 1610 may be performed using the wireless communication manager 620 or 720 described with reference to FIG. 6 or 7, the UE wireless communication manager 1150 descried with reference to FIG. 11, or the LBT procedure identifier 640 or 740 described with reference to FIG. 6 or 7.

When the information indicative of the at least one type of LBT procedure to perform for the uplink transmission indicates a duration of a portion of a maximum channel occupancy time for which the shared spectrum is reserved by a network access device and available for uplink transmissions, the at least one type of LBT procedure to perform for the uplink transmission may be identified based at least in part on the duration of the portion of the maximum channel occupancy time for which the shared spectrum is reserved by the network access device and available for uplink transmissions and a duration of the uplink transmission.

At block 1615, the method 1600 may include performing, for a shared spectrum, the at least one type of multi-carrier LBT procedure for the uplink transmission. The operation(s) at block 1615 may be performed using the wireless communication manager 620 or 720 described with reference to FIG. 6 or 7, the UE wireless communication manager 1150 descried with reference to FIG. 11, or the LBT procedure manager 645 or 745 described with reference to FIG. 6 or 7.

Thus, the method 1600 may provide for wireless communication. It should be noted that the method 1600 is just one implementation and that the operations of the method 1600 may be rearranged or otherwise modified such that other implementations are possible.

In some examples, aspects of the methods 1300, 1400, 1500, or 1600 described with reference to FIG. 13, 14, 15, or 16 may be combined.

Figure 17:
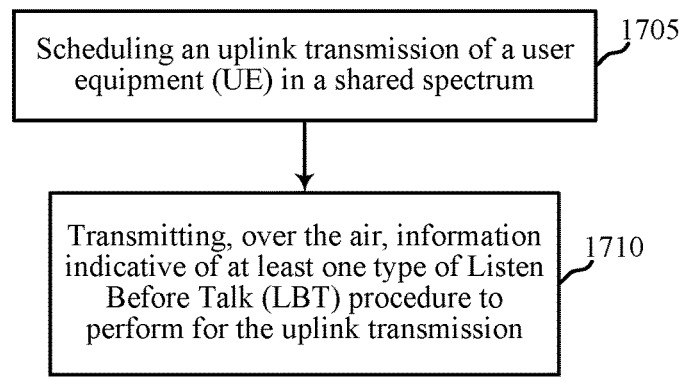
FIG. 17 is a flow chart illustrating an example of a method for wireless communication at a network access device, in accordance with various aspects of the present disclosure.

FIG. 17 is a flow chart illustrating an example of a method 1700 for wireless communication at a network access device, in accordance with various aspects of the present disclosure. For clarity, the method 1700 is described below with reference to aspects of one or more of the base stations 105, 205, 205-*a*, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 1705, the method 1700 may include scheduling an uplink transmission of a UE in a shared spectrum. In some examples, scheduling the uplink transmission may include transmitting an uplink grant to the UE for the uplink transmission. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 1705 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 1710, the method 1700 may include transmitting, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the method 1700 may include transmitting a common PDCCH, and the method 1700 may include signaling the information indicative of the at least one type of LBT procedure to perform for the uplink transmission in the common PDCCH. The operation(s) at block 1710 may be performed using the wireless communication manager 820 or 920 described with reference to FIG. 8 or 9, the base station wireless communication manager 1260 descried with reference to FIG. 12, or the LBT procedure information transmission manager 840 or 940 described with reference to FIG. 8 or 9.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

Thus, the method 1700 may provide for wireless communication. It should be noted that the method 1700 is just one implementation and that the operations of the method 1700 may be rearranged or otherwise modified such that other implementations are possible.

Figure 18:
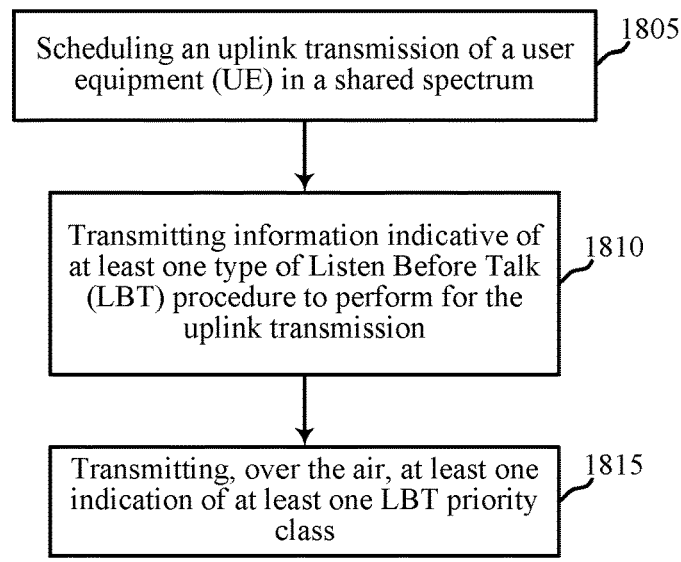
FIG. 18 is a flow chart illustrating an example of a method for wireless communication at a network access device, in accordance with various aspects of the present disclosure.

FIG. 18 is a flow chart illustrating an example of a method 1800 for wireless communication at a network access device, in accordance with various aspects of the present disclosure. For clarity, the method 1800 is described below with reference to aspects of one or more of the base stations 105, 205, 205-*a*, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 1805, the method 1800 may include scheduling an uplink transmission of a UE in a shared spectrum. In some examples, scheduling the uplink transmission may include transmitting an uplink grant to the UE for the uplink transmission. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 1805 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 1810, the method 1800 may include transmitting, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the method 1800 may include transmitting a common PDCCH, and the method 1800 may include signaling the information indicative of the at least one type of LBT procedure to perform for the uplink transmission in the common PDCCH. The operation(s) at block 1810 may be performed using the wireless communication manager 820 or 920 described with reference to FIG. 8 or 9, the base station wireless communication manager 1260 descried with reference to FIG. 12, or the LBT procedure information transmission manager 840 or 940 described with reference to FIG. 8 or 9.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

At block 1815, the method 1800 may include transmitting at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof. In some examples, the first LBT priority class may be associated with the network access device performing a LBT procedure to contend for access to: at least a first carrier of the shared spectrum on which the uplink transmission is scheduled, or at least a second carrier of the shared spectrum used to cross-carrier schedule the uplink transmission. In some examples, the at least one indication of at least one LBT priority class may be transmitted in an uplink grant (e.g., the uplink grant used to schedule the uplink transmission). The operation(s) at block 1810 may be performed using the wireless communication manager 820 or 920 described with reference to FIG. 8 or 9, the base station wireless communication manager 1260 descried with reference to FIG. 12, or the LBT priority class indicator 945 described with reference to FIG. 9.

Thus, the method 1800 may provide for wireless communication. It should be noted that the method 1800 is just one implementation and that the operations of the method 1800 may be rearranged or otherwise modified such that other implementations are possible.

Figure 19:
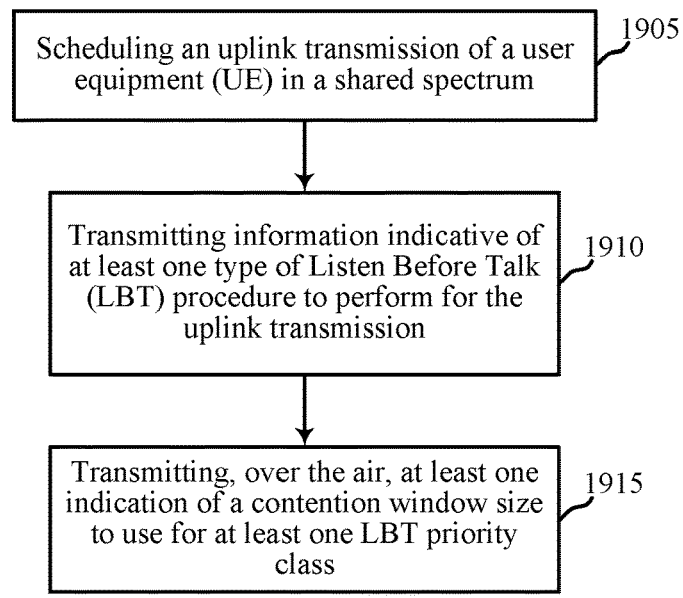
FIG. 19 is a flow chart illustrating an example of a method for wireless communication at a network access device, in accordance with various aspects of the present disclosure.

FIG. 19 is a flow chart illustrating an example of a method 1900 for wireless communication at a network access device, in accordance with various aspects of the present disclosure. For clarity, the method 1900 is described below with reference to aspects of one or more of the base stations 105, 205, 205-a, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 1905, the method 1900 may include scheduling an uplink transmission of a UE in a shared spectrum. In some examples, scheduling the uplink transmission may include transmitting an uplink grant to the UE for the uplink transmission. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 1905 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 1910, the method 1900 may include transmitting, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the method 1900 may include transmitting a common PDCCH, and the method 1900 may include signaling the information indicative of the at least one type of LBT procedure to perform for the uplink transmission in the common PDCCH. The operation(s) at block 1910 may be performed using the wireless communication manager 820 or 920 described with reference to FIG. 8 or 9, the base station wireless communication manager 1260 descried with reference to FIG. 12, or the LBT procedure information transmission manager 840 or 940 described with reference to FIG. 8 or 9.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

At block 1915, the method 1900 may include transmitting at least one indication of a contention window size to use for at least one LBT priority class. In some examples, the at least one indication of a contention window size to use for at least one LBT priority class may include a ratio of contention window sizes for each LBT priority class of the at least one LBT priority class. In some examples, each ratio of contention window sizes may include a ratio of contention window size for a LBT priority class and a default contention window size. In some examples, at least one indication of a contention window size may be signaled in an uplink grant (e.g., the uplink grant used to schedule the uplink transmission). The operation(s) at block 1915 may be performed using the wireless communication manager 820 or 920 described with reference to FIG. 8 or 9, the base station wireless communication manager 1260 descried with reference to FIG. 12, or the contention window size transmission manager 950 described with reference to FIG. 9.

Thus, the method 1900 may provide for wireless communication. It should be noted that the method 1900 is just one implementation and that the operations of the method 1900 may be rearranged or otherwise modified such that other implementations are possible.

Figure 20:
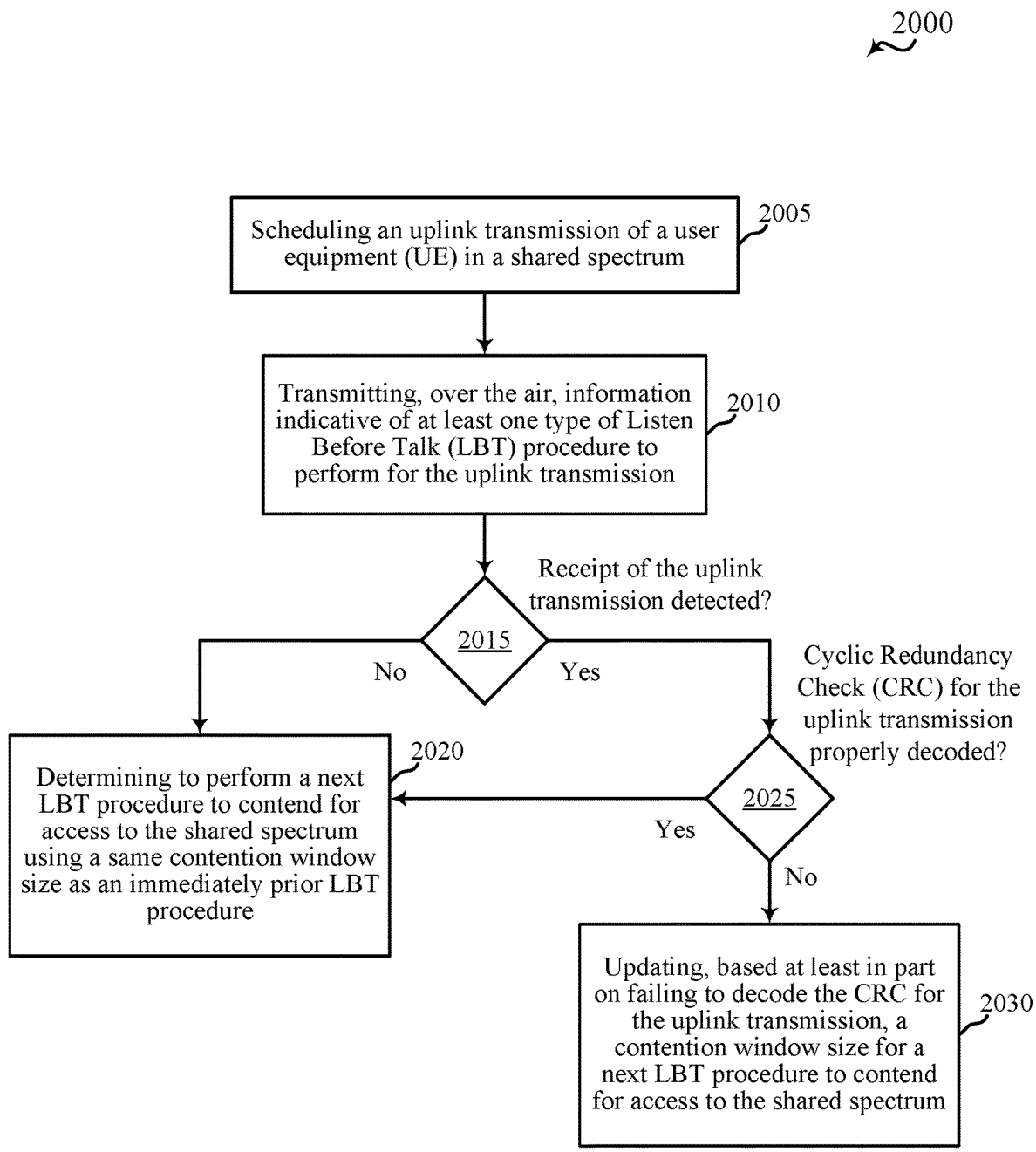
FIG. 20 is a flow chart illustrating an example of a method for wireless communication at a network access device, in accordance with various aspects of the present disclosure.

FIG. 20 is a flow chart illustrating an example of a method 2000 for wireless communication at a network access device, in accordance with various aspects of the present disclosure. For clarity, the method 2000 is described below with reference to aspects of one or more of the base stations 105, 205, 205-a, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 2005, the method 2000 may include scheduling an uplink transmission of a UE in a shared spectrum. In some examples, scheduling the uplink transmission may include transmitting an uplink grant to the UE for the uplink transmission. The shared spectrum may include an unlicensed radio frequency spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 2005 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 2010, the method 2000 may include transmitting, over the air (e.g., in the shared spectrum), information indicative of at least one type of LBT procedure to perform for the uplink transmission. In some examples, the information indicative of the at least one type of LBT procedure to perform for the uplink transmission may include at least one bit transmitted in an uplink grant for the uplink transmission. In some examples, the method 2000 may include transmitting a common PDCCH, and the method 2000 may include signaling the information indicative of the at least one type of LBT procedure to perform for the uplink transmission in the common PDCCH. The operation(s) at block 2010 may be performed using the wireless communication manager 820 or 920 described with reference to FIG. 8 or 9, the base station wireless communication manager 1260 descried with reference to FIG. 12, or the LBT procedure information transmission manager 840 or 940 described with reference to FIG. 8 or 9.

In some examples, the information indicative of the at least one type of LBT procedure to perform for the uplink transmission may indicate at least one of: whether a duration of the uplink transmission is within a maximum channel occupancy time for which a shared spectrum is reserved by the network access device, or a type of LBT procedure to perform prior to transmitting the uplink transmission, or a combination thereof. In these examples, the information may include at least one bit transmitted in an uplink grant.

In some examples, the information indicative of the at least one type of LBT procedure to perform for the uplink transmission may indicate a duration of a portion of a maximum channel occupancy time for which the shared spectrum is reserved by the network access device and available for uplink transmissions. In these examples, the information indicative of the at least one type of LBT procedure to perform for the uplink transmission may be signaled in a common PDCCH.

At block 2015, the method 2000 may include determining whether receipt of the uplink transmission is detected. Upon not detecting receipt of the uplink transmission, the method 2000 may continue at block 2020. Upon detecting receipt of the uplink transmission, the method 2000 may continue at block 2025. The operation(s) at block 2015 may be performed using the wireless communication manager 820 or 920 described with reference to FIG. 8 or 9, the base station wireless communication manager 1260 descried with reference to FIG. 12, or the uplink transmission reception manager 955 described with reference to FIG. 9.

At block 2020, the method 2000 may include determining to perform a next LBT procedure to contend for access to the shared spectrum using a same contention window size as an immediately prior LBT procedure. The operation(s) at block 2020 may be performed using the wireless communication manager 820 or 920 described with reference to FIG. 8 or 9, the base station wireless communication manager 1260 descried with reference to FIG. 12, or the contention window sizer 960 described with reference to FIG. 9.

At block 2025, the method 2000 may include determining whether a CRC for the uplink transmission is properly decoded. Upon properly decoding the CRC, the method 2000 may continue at block 2020. Upon failing to decode the CRC, the method 2000 may continue at block 2030. The operation(s) at block 2025 may be performed using the wireless communication manager 820 or 920 described with reference to FIG. 8 or 9, the base station wireless communication manager 1260 descried with reference to FIG. 12, or the uplink transmission reception manager 955 described with reference to FIG. 9.

At block 2030, the method 2000 may include updating, based at least in part on failing to decode the CRC for the uplink transmission, a contention window size for a next LBT procedure to contend for access to the shared spectrum. The operation(s) at block 2020 may be performed using the wireless communication manager 820 or 920 described with reference to FIG. 8 or 9, the base station wireless communication manager 1260 descried with reference to FIG. 12, or the contention window sizer 960 described with reference to FIG. 9.

Thus, the method 2000 may provide for wireless communication. It should be noted that the method 2000 is just one implementation and that the operations of the method 2000 may be rearranged or otherwise modified such that other implementations are possible.

Figure 21:
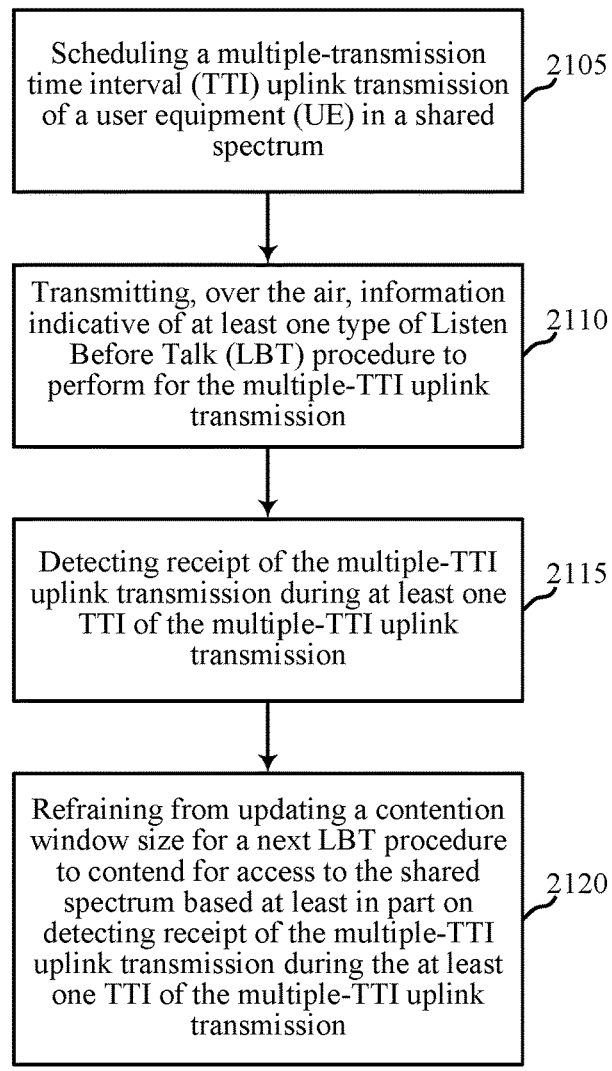
FIG. 21 is a flow chart illustrating an example of a method for wireless communication at a network access device, in accordance with various aspects of the present disclosure.

FIG. 21 is a flow chart illustrating an example of a method 2100 for wireless communication at a network access device, in accordance with various aspects of the present disclosure. For clarity, the method 2100 is described below with reference to aspects of one or more of the base stations 105, 205, 205-*a*, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 2105, the method 2100 may include scheduling a multiple-TTI uplink transmission of a UE in a shared spectrum. In some examples, scheduling the uplink transmission may include transmitting an uplink grant to the UE for the uplink transmission. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 2105 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 2110, the method 2100 may include transmitting, over the air (e.g., in the shared spectrum), information indicative of at least one type of LBT procedure to perform for the multiple-TTI uplink transmission. In some examples, the information indicative of the at least one type of LBT procedure to perform for the multiple-TTI uplink transmission may include at least one bit transmitted in an uplink grant for the uplink transmission. In some examples, the method 2100 may include transmitting a common PDCCH, and the method 2100 may include signaling the information indicative of the at least one type of LBT procedure to perform for the multiple-TTI uplink transmission in the common PDCCH. The operation(s) at block 2110 may be performed using the wireless communication manager 820 or 920 described with reference to FIG. 8 or 9, the base station wireless communication manager 1260 descried with reference to FIG. 12, or the LBT procedure information transmission manager 840 or 940 described with reference to FIG. 8 or 9.

In some examples, the information indicative of the at least one type of LBT procedure to perform for the multiple-TTI uplink transmission may indicate at least one of: whether a duration of the multiple-TTI uplink transmission is within a maximum channel occupancy time for which a shared spectrum is reserved by the network access device, or a type of LBT procedure to perform prior to transmitting the multiple-TTI uplink transmission, or a combination thereof. In these examples, the information may include at least one bit transmitted in an uplink grant.

In some examples, the information indicative of the at least one type of LBT procedure to perform for the multiple-TTI uplink transmission may indicate a duration of a portion of a maximum channel occupancy time for which the shared spectrum is reserved by the network access device and available for uplink transmissions. In these examples, the information indicative of the at least one type of LBT procedure to perform for the multiple-TTI uplink transmission may be signaled in a common PDCCH.

At block 2115, the method 2100 may include detecting receipt of the multiple-TTI uplink transmission during at least one TTI of the multiple-TTI uplink transmission. The operation(s) at block 2115 may be performed using the wireless communication manager 820 or 920 described with reference to FIG. 8 or 9, the base station wireless communication manager 1260 descried with reference to FIG. 12, or the uplink transmission reception manager 955 or multiple-TTI uplink transmission reception manager 965 described with reference to FIG. 9.

At block 2120, the method 2100 may include refraining from updating a contention window size for a next LBT procedure to contend for access to the shared spectrum based at least in part on detecting receipt of the multiple-TTI uplink transmission during the at least one TTI of the multiple-TTI uplink transmission. In some examples, the refraining from updating the contention window size for the next LBT procedure may be further based at least in part on not detecting a LBT gap on the shared spectrum during the multiple TTIs of the multiple-TTI uplink transmission. The operation(s) at block 2120 may be performed using the wireless communication manager 820 or 920 described with reference to FIG. 8 or 9, the base station wireless communication manager 1260 descried with reference to FIG. 12, or the contention window sizer 960 described with reference to FIG. 9.

Thus, the method 2100 may provide for wireless communication. It should be noted that the method 2100 is just one implementation and that the operations of the method 2100 may be rearranged or otherwise modified such that other implementations are possible.

Figure 22:
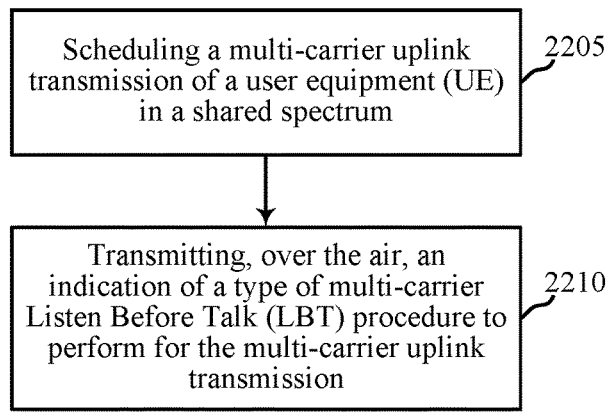
FIG. 22 is a flow chart illustrating an example of a method for wireless communication at a network access device, in accordance with various aspects of the present disclosure.

FIG. 22 is a flow chart illustrating an example of a method 2200 for wireless communication at a network access device, in accordance with various aspects of the present disclosure. For clarity, the method 2200 is described below with reference to aspects of one or more of the base stations 105, 205, 205-*a*, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 2205, the method 2200 may include scheduling a multi-carrier uplink transmission of a UE in a shared spectrum. In some examples, scheduling the multi-carrier uplink transmission may include transmitting an uplink grant to the UE for the multi-carrier uplink transmission. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 2205 may be performed using the wireless communication manager 820 or 920 described with reference to FIG. 8 or 9, the base station wireless communication manager 1260 descried with reference to FIG. 12, or the uplink transmission scheduler 835 or 935 described with reference to FIG. 8 or 9.

At block 2210, the method 2200 may include transmitting, over the air (e.g., in the shared spectrum), an indication of a type of multi-carrier LBT procedure to perform for the multi-carrier uplink transmission. In some examples, the indication of the type of multi-carrier LBT procedure to perform may be transmitted in RRC signaling. In some examples, the indication may be transmitted prior to transmission of the uplink grant used to schedule the multi-carrier uplink transmission. The operation(s) at block 2210 may be performed using the wireless communication manager 820 or 920 described with reference to FIG. 8 or 9, the base station wireless communication manager 1260 descried with reference to FIG. 12, the LBT procedure information transmission manager 840 or 940 described with reference to FIG. 8 or 9, or the multi-carrier LBT procedure information transmission manager 970 described with reference to FIG. 9.

In some examples, the type of multi-carrier LBT procedure to perform may include: a type of LBT procedure performed for a UE-selected primary carrier in the shared spectrum, or a type of LBT procedure performed for a PUCCH carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

Thus, the method 2200 may provide for wireless communication. It should be noted that the method 2200 is just one implementation and that the operations of the method 2200 may be rearranged or otherwise modified such that other implementations are possible.

Figure 23:
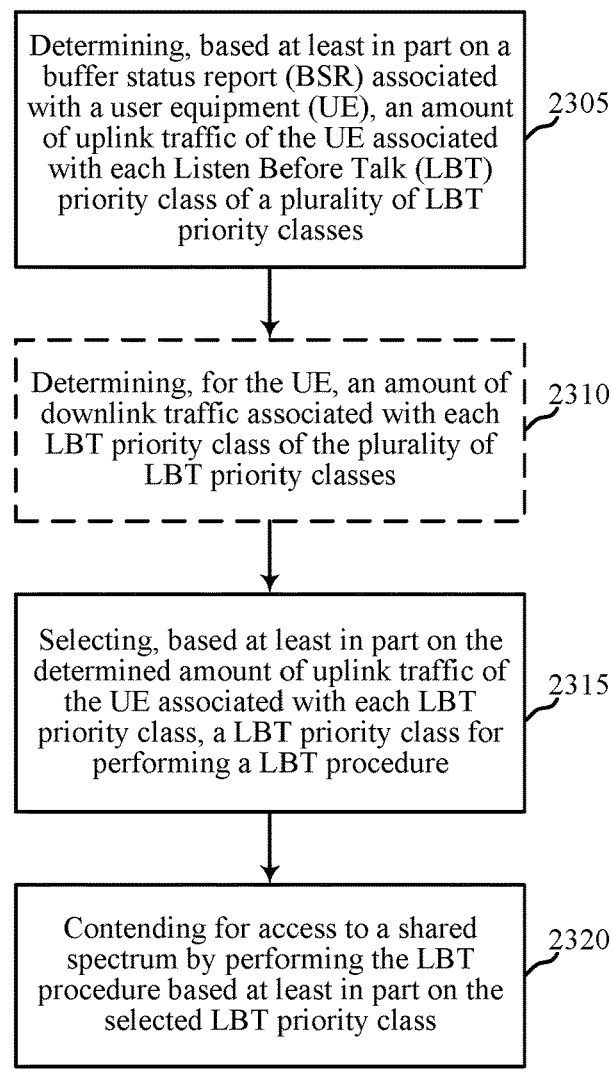
FIG. 23 is a flow chart illustrating an example of a method for wireless communication at a network access device, in accordance with various aspects of the present disclosure.

FIG. 23 is a flow chart illustrating an example of a method 2300 for wireless communication at a network access device, in accordance with various aspects of the present disclosure. For clarity, the method 2300 is described below with reference to aspects of one or more of the base stations 105, 205, 205-a, or 1205 described with reference to FIG. 1, 2, or 12, or aspects of one or more of the apparatuses 805 or 905 described with reference to FIG. 8 or 9. In some examples, a network access device may execute one or more sets of codes to control the functional elements of the network access device to perform the functions described below. Additionally or alternatively, the network access device may perform one or more of the functions described below using special-purpose hardware.

At block 2305, the method 2300 may include determining, based at least in part on a BSR associated with a UE, an amount of uplink traffic of the UE associated with each LBT priority class of a plurality of LBT priority classes. The operation(s) at block 2305 may be performed using the wireless communication manager 820 or 920 described with reference to FIG. 8 or 9, the base station wireless communication manager 1260 descried with reference to FIG. 12, or the uplink traffic assessor 975 described with reference to FIG. 9.

At block 2310, the method 2300 may optionally include determining, for the UE, an amount of downlink traffic associated with each LBT priority class of the plurality of LBT priority classes. The operation(s) at block 2310 may be performed using the wireless communication manager 820 or 920 described with reference to FIG. 8 or 9, the base station wireless communication manager 1260 descried with reference to FIG. 12, or the downlink traffic assessor 980 described with reference to FIG. 9.

At block 2315, the method 2300 may include selecting, based at least in part on the determined amount of uplink traffic of the UE associated with each LBT priority class (determined at block 2305), a LBT priority class for performing a LBT procedure. In some examples, the LBT priority class for performing the LBT procedure may be further selected based at least in part on the determined amount of downlink traffic associated with each LBT priority class (determined at block 2310). The operation(s) at block 2315 may be performed using the wireless communication manager 820 or 920 described with reference to FIG. 8 or 9, the base station wireless communication manager 1260 descried with reference to FIG. 12, or the LBT priority class selector 985 described with reference to FIG. 9.

At block 2320, the method 2300 may include contending for access to a shared spectrum by performing the LBT procedure based at least in part on the selected LBT priority class. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 2320 may be performed using the wireless communication manager 820 or 920 described with reference to FIG. 8 or 9, the base station wireless communication manager 1260 descried with reference to FIG. 12, or the shared spectrum contention manager 990 described with reference to FIG. 9.

Thus, the method 2300 may provide for wireless communication. It should be noted that the method 2300 is just one implementation and that the operations of the method 2300 may be rearranged or otherwise modified such that other implementations are possible.

In some examples, aspects of the methods 1700, 1800, 1900, 2000, 2100, 2200, or 2300 described with reference to FIG. 17, 18, 19, 20, 21, 22, or 23 may be combined.

Figure 24:
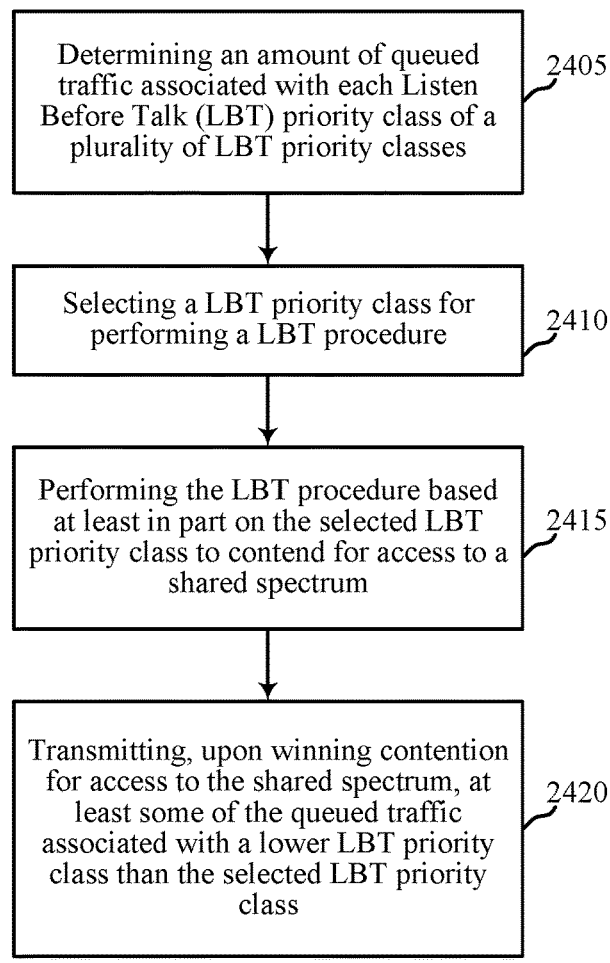
FIG. 24 is a flow chart illustrating an example of a method for wireless communication at a wireless communication device, in accordance with various aspects of the present disclosure.

FIG. 24 is a flow chart illustrating an example of a method 2400 for wireless communication at a wireless communication device, in accordance with various aspects of the present disclosure. For clarity, the method 2400 is described below with reference to aspects of one or more of the UEs 115, 215, 215-a, 215-b, or 1115 described with reference to FIG. 1, 2, or 10, aspects of one or more of the base stations 105, 205, 205-a, or 1205 described with reference to FIG. 1, 2, or 11, or aspects of one or more of the apparatuses 615, 715, 805, 905, or 1035 described with reference to FIG. 6, 7, 8, 9, or 10. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 2405, the method 2400 may include determining an amount of queued traffic associated with each LBT priority class of a plurality of LBT priority classes. The operation(s) at block 2405 may be performed using the wireless communication manager 620, 720, 820, 920, or 1020 described with reference to FIG. 6, 7, 8, 9, or 10, the UE wireless communication manager 1150 described with reference to FIG. 11, the base station wireless communication manager 1260 descried with reference to FIG. 12, or the queued traffic classifier 1040 described with reference to FIG. 10.

At block 2410, the method 2400 may include selecting a LBT priority class for performing a LBT procedure. The operation(s) at block 2410 may be performed using the wireless communication manager 620, 720, 820, 920, or 1020 described with reference to FIG. 6, 7, 8, 9, or 10, the UE wireless communication manager 1150 described with reference to FIG. 11, the base station wireless communication manager 1260 descried with reference to FIG. 12, or the LBT priority class selector 1045 described with reference to FIG. 10.

At block 2415, the method 2400 may include performing the LBT procedure based at least in part on the selected LBT priority class to contend for access to a shared spectrum. The shared spectrum may include an unlicensed spectrum, a radio frequency spectrum available for Wi-Fi use, a radio frequency spectrum available for use by different radio access technologies, or a radio frequency spectrum available for use by multiple MNOs in an equally shared or prioritized manner. The operation(s) at block 2415 may be performed using the wireless communication manager 620, 720, 820, 920, or 1020 described with reference to FIG. 6, 7, 8, 9, or 10, the UE wireless communication manager 1150 described with reference to FIG. 11, the base station wireless communication manager 1260 descried with reference to FIG. 12, or the LBT procedure manager 1050 described with reference to FIG. 10.

At block 2420, the method 2400 may include transmitting, upon winning contention for access to the shared spectrum, at least some of the queued traffic associated with a lower LBT priority class than the selected LBT priority class. The operation(s) at block 2420 may be performed using the wireless communication manager 620, 720, 820, 920, or 1020 described with reference to FIG. 6, 7, 8, 9, or 10, the UE wireless communication manager 1150 described with reference to FIG. 11, the base station wireless communication manager 1260 descried with reference to FIG. 12, or the data transmission manager 1055 described with reference to FIG. 10.

Thus, the method 2400 may provide for wireless communication. It should be noted that the method 2400 is just one implementation and that the operations of the method 2400 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving, over the air, in an uplink grant for an uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit received in the uplink grant;
   identifying, from the received information, the indicated type of LBT procedure to perform for the uplink transmission; and
   performing, for a shared spectrum, the indicated type of LBT procedure for the uplink transmission.

2. The method of claim 1, wherein the information indicative of the one of multiple types of LBT procedures, each of the multiple types of LBT procedures being associated with the uplink transmission, indicates at least one of:
   whether a duration of the uplink transmission is within a maximum channel occupancy time for which the shared spectrum is reserved by a network access device, or a type of LBT procedure to perform prior to transmitting the uplink transmission, or a combination thereof.

3. The method of claim 1, wherein the information indicative of the one of multiple types of LBT procedures, each of the multiple types of LBT procedures being associated with the uplink transmission, indicates a duration of a portion of a maximum channel occupancy time for which the shared spectrum is reserved by a network access device and available for uplink transmissions.

4. The method of claim 3, further comprising:
   receiving a common physical downlink control channel (PDCCH);
   wherein the information indicative of the one of multiple types of LBT procedures, each of the multiple types of LBT procedures being associated with the uplink transmission, is signaled in the common PDCCH.

5. The method of claim 3, wherein the indicated type of LBT procedure to perform for the uplink transmission is identified based at least in part on the duration of the portion of the maximum channel occupancy time for which the shared spectrum is reserved by the network access device and available for uplink transmissions and a duration of the uplink transmission.

6. The method of claim 1, further comprising:
   receiving at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof.

7. The method of claim 6, wherein the first LBT priority class is associated with the network access device performing a LBT procedure to contend for access to:
   at least a first carrier of the shared spectrum on which the uplink transmission is scheduled, or at least a second carrier of the shared spectrum used to cross-carrier schedule the uplink transmission.

8. The method of claim 6,
   wherein the at least one indication of the at least one LBT priority class is received in the uplink grant.

9. The method of claim 6, further comprising:
   determining whether the network access device successfully contended for access to the shared spectrum; and
   determining whether to perform a LBT procedure for the uplink transmission based at least in part on the first LBT priority class or the second LBT priority class, based at least in part on determining whether the network access device successfully contended for access to the shared spectrum.

10. The method of claim 6, further comprising:
identifying a LBT priority class in the at least one LBT priority class for performing a LBT procedure for the uplink transmission;
selecting data for transmission during the uplink transmission based at least in part on the identified LBT priority class; and
transmitting the selected data during the uplink transmission.

11. The method of claim 1, further comprising:
receiving at least one indication of a contention window size to use for at least one LBT priority class;
selecting a LBT priority class for performing a LBT procedure for the shared spectrum; and
sizing a contention window for the LBT procedure based at least in part on an indication of a contention window size corresponding to the selected LBT priority class.

12. The method of claim 11, wherein the at least one indication of a contention window size to use for at least one LBT priority class comprises a ratio of contention window sizes for each LBT priority class of the at least one LBT priority class.

13. The method of claim 12, wherein each ratio of contention window sizes comprises a ratio of a contention window size for a LBT priority class and a default contention window size.

14. The method of claim 11,
wherein the at least one indication of a contention window size to use for at least one LBT priority class is received in the uplink grant.

15. The method of claim 1, further comprising:
receiving an indication of a type of multi-carrier LBT procedure to perform for the uplink transmission.

16. The method of claim 15, wherein the type of multi-carrier LBT procedure to perform comprises:
a type of LBT procedure performed for a UE-selected primary carrier in the shared spectrum, or a type of LBT procedure performed for a physical uplink control channel (PUCCH) carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

17. The method of claim 15, wherein the indication of the type of multi-carrier LBT procedure to perform is received in radio resource control (RRC) signaling.

18. An apparatus for wireless communication at a user equipment (UE), comprising:
means for receiving, over the air, in an uplink grant for an uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit received in the uplink grant;
means for identifying, from the received information, the indicated type of LBT procedure to perform for the uplink transmission; and
means for performing, for a shared spectrum, the indicated type of LBT procedure for the uplink transmission.

19. The apparatus of claim 18, wherein the information indicative of the one of multiple types of LBT procedures, each of the multiple types of LBT procedures being associated with the uplink transmission, indicates at least one of:
whether a duration of the uplink transmission is within a maximum channel occupancy time for which the shared spectrum is reserved by a network access device, or a type of LBT procedure to perform prior to transmitting the uplink transmission, or a combination thereof.

20. The apparatus of claim 18, wherein the information indicative of the one of multiple types of LBT procedures, each of the multiple types of LBT procedures being associated with the uplink transmission, indicates a duration of a portion of a maximum channel occupancy time for which the shared spectrum is reserved by a network access device and available for uplink transmissions.

21. The apparatus of claim 20, further comprising:
means for receiving a common physical downlink control channel (PDCCH);
wherein the information indicative of the one of multiple types of LBT procedures, each of the multiple types of LBT procedures being associated with the uplink transmission, is signaled in the common PDCCH.

22. The apparatus of claim 20, wherein the one of multiple types of LBT procedures, each of the multiple types of LBT procedures being associated with the uplink transmission, is identified based at least in part on the duration of the portion of the maximum channel occupancy time for which the shared spectrum is reserved by the network access device and available for uplink transmissions and a duration of the uplink transmission.

23. The apparatus of claim 18, further comprising:
means for receiving at least one indication of at least one LBT priority class including: a first LBT priority class used by a network access device when performing a LBT procedure to contend for access to the shared spectrum, or a second LBT priority class to be used for performing a type of LBT procedure for the uplink transmission when contention for access to the shared spectrum by the network access device is unsuccessful, or a combination thereof.

24. The apparatus of claim 23, wherein the first LBT priority class is associated with the network access device performing a LBT procedure to contend for access to:
at least a first carrier of the shared spectrum on which the uplink transmission is scheduled, or at least a second carrier of the shared spectrum used to cross-carrier schedule the uplink transmission.

25. The apparatus of claim 23,
wherein the at least one indication of the at least one LBT priority class is received in the uplink grant.

26. The apparatus of claim 23, further comprising:
means for determining whether the network access device successfully contended for access to the shared spectrum; and
means for determining whether to perform a LBT procedure for the uplink transmission based at least in part on the first LBT priority class or the second LBT priority class, based at least in part on determining whether the network access device successfully contended for access to the shared spectrum.

27. The apparatus of claim 23, further comprising:
means for identifying a LBT priority class in the at least one LBT priority class for performing a LBT procedure for the uplink transmission;
means for selecting data for transmission during the uplink transmission based at least in part on the identified LBT priority class; and means for transmitting the selected data during the uplink transmission.

28. The apparatus of claim 18, further comprising:
means for receiving at least one indication of a contention window size to use for at least one LBT priority class;
means for selecting a LBT priority class for performing a LBT procedure for the shared spectrum; and
means for sizing a contention window for the LBT procedure based at least in part on an indication of a contention window size corresponding to the selected LBT priority class.

29. The apparatus of claim 28, wherein the at least one indication of a contention window size to use for at least one LBT priority class comprises a ratio of contention window sizes for each LBT priority class of the at least one LBT priority class.

30. The apparatus of claim 29, wherein each ratio of contention window sizes comprises a ratio of a contention window size for a LBT priority class and a default contention window size.

31. The apparatus of claim 28,
wherein the at least one indication of a contention window size to use for at least one LBT priority class is received in the uplink grant.

32. The apparatus of claim 18, further comprising:
receiving an indication of a type of multi-carrier LBT procedure to perform for the uplink transmission.

33. The apparatus of claim 32, wherein the type of multi-carrier LBT procedure to perform comprises:
a type of LBT procedure performed for a UE-selected primary carrier in the shared spectrum, or a type of LBT procedure performed for a physical uplink control channel (PUCCH) carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

34. The apparatus of claim 32, wherein the indication of the type of multi-carrier LBT procedure to perform is received in radio resource control (RRC) signaling.

35. An apparatus for wireless communication at a user equipment (UE), comprising:
a processor; and
memory coupled to the processor, wherein the processor is configured to:
receive, over the air, in an uplink grant for an uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit received in the uplink grant;
identify, from the received information, the indicated type of LBT procedure to perform for the uplink transmission; and
perform, for a shared spectrum, the indicated type of LBT procedure for the uplink transmission.

36. A non-transitory computer-readable medium for storing instructions executable by a processor of a user equipment (UE), comprising:
instructions to receive, over the air, in an uplink grant for an uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit received in the uplink grant;
instructions to identify, from the received information, the indicated type of LBT procedure to perform for the uplink transmission; and
instructions to perform, for a shared spectrum, the indicated type of LBT procedure for the uplink transmission.

37. A method for wireless communication at a network access device, comprising:
scheduling an uplink transmission of a user equipment (UE) in a shared spectrum; and
transmitting, over the air, in an uplink grant to the UE for the uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit in the uplink grant.

38. The method of claim 37, wherein the information indicative of the one of multiple types of LBT procedures, each of the multiple types of LBT procedures being associated with the uplink transmission, indicates at least one of:
whether a duration of the uplink transmission is within a maximum channel occupancy time for which the shared spectrum is reserved by the network access device, or a type of LBT procedure to perform prior to transmitting the uplink transmission, or a combination thereof.

39. The method of claim 37, wherein the information indicative of the one of multiple types of LBT procedures, each of the multiple types of LBT procedures being associated with the uplink transmission, indicates a duration of a portion of a maximum channel occupancy time for which the shared spectrum is reserved by the network access device and available for uplink transmissions.

40. The method of claim 39, further comprising:
transmitting a common physical downlink control channel (PDCCH); and
signaling the information indicative of the one of multiple types of LBT procedures, each of the multiple types of LBT procedures being associated with the uplink transmission, in the common PDCCH.

41. The method of claim 37, further comprising:
transmitting at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof.

42. The method of claim 41, wherein the first LBT priority class is associated with the network access device performing a LBT procedure to contend for access to:
at least a first carrier of the shared spectrum on which the uplink transmission is scheduled, or at least a second carrier of the shared spectrum used to cross-carrier schedule the uplink transmission.

43. The method of claim 41,
wherein the at least one indication of the at least one LBT priority class is transmitted in the uplink grant.

44. The method of claim 37, further comprising:
transmitting at least one indication of a contention window size to use for at least one LBT priority class.

45. The method of claim 44, wherein the at least one indication of a contention window size to use for at least one LBT priority class comprises a ratio of contention window sizes for each LBT priority class of the at least one LBT priority class.

46. The method of claim 45, wherein each ratio of contention window sizes comprises a ratio of contention window size for a LBT priority class and a default contention window size.

47. The method of claim 44,
wherein the at least one indication of a contention window size to use for at least one LBT priority class is signaled in the uplink grant.

48. The method of claim 37, further comprising:
detecting receipt of the uplink transmission;
failing to decode a cyclic redundancy check (CRC) for the uplink transmission; and
updating, based at least in part on failing to decode the CRC for the uplink transmission, a contention window size for a next LBT procedure to contend for access to the shared spectrum.

49. The method of claim 37, wherein the uplink transmission comprises a multiple-transmission time interval (TTI) uplink transmission, the method further comprising:
transmitting a multiple-TTI uplink grant for the multiple-TTI uplink transmission;
detecting receipt of the multiple-TTI uplink transmission during at least one TTI of the multiple-TTI uplink transmission; and
refraining from updating a contention window size for a next LBT procedure to contend for access to the shared spectrum based at least in part on detecting receipt of the multiple-TTI uplink transmission during the at least one TTI of the multiple-TTI uplink transmission.

50. The method of claim 49, wherein the refraining from updating the contention window size for the next LBT procedure is further based at least in part on not detecting a LBT gap on the shared spectrum during the multiple TTIs of the multiple-TTI uplink transmission.

51. The method of claim 37, further comprising:
transmitting an indication of a type of multi-carrier LBT procedure to perform for the uplink transmission.

52. The method of claim 51, wherein the type of multi-carrier LBT procedure to perform comprises:
a type of LBT procedure performed for a UE-selected primary carrier in the shared spectrum, or a type of LBT procedure performed for a physical uplink control channel (PUCCH) carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

53. The method of claim 51, wherein the indication of the type of multi-carrier LBT procedure to perform is transmitted in radio resource control (RRC) signaling.

54. An apparatus for wireless communication at a network access device, comprising:
means for scheduling an uplink transmission of a user equipment (UE) in a shared spectrum; and
means for transmitting, over the air, in an uplink grant to the UE for the uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit in the uplink grant.

55. The apparatus of claim 54, wherein the information indicative of the one of multiple types of LBT procedures, each of the multiple types of LBT procedures being associated with the uplink transmission, indicates at least one of:
whether a duration of the uplink transmission is within a maximum channel occupancy time for which the shared spectrum is reserved by the network access device, or a type of LBT procedure to perform prior to transmitting the uplink transmission, or a combination thereof.

56. The apparatus of claim 54, wherein the information indicative of the one of multiple types of LBT procedures, each of the multiple types of LBT procedures being associated with the uplink transmission, indicates a duration of a portion of a maximum channel occupancy time for which the shared spectrum is reserved by the network access device and available for uplink transmissions.

57. The apparatus of claim 56, further comprising:
means for transmitting a common physical downlink control channel (PDCCH); and
means for signaling the information indicative of the one of multiple types of LBT procedures, each of the multiple types of LBT procedures being associated with the uplink transmission, in the common PDCCH.

58. The apparatus of claim 54, further comprising:
means for transmitting at least one indication of at least one LBT priority class including: a first LBT priority class used by the network access device when performing a LBT procedure to contend for access to the shared spectrum, or a second LBT priority class to be used by the UE for performing a type of LBT procedure for the uplink transmission when contention for access to the shared spectrum by the network access device is unsuccessful, or a combination thereof.

59. The apparatus of claim 58, wherein the first LBT priority class is associated with the network access device performing a LBT procedure to contend for access to:
at least a first carrier of the shared spectrum on which the uplink transmission is scheduled, or at least a second carrier of the shared spectrum used to cross-carrier schedule the uplink transmission.

60. The apparatus of claim 58,
wherein the at least one indication of the at least one LBT priority class is transmitted in the uplink grant.

61. The apparatus of claim 54, further comprising:
transmitting at least one indication of a contention window size to use for at least one LBT priority class.

62. The apparatus of claim 61, wherein the at least one indication of a contention window size to use for at least one LBT priority class comprises a ratio of contention window sizes for each LBT priority class of the at least one LBT priority class.

63. The apparatus of claim 62, wherein each ratio of contention window sizes comprises a ratio of contention window size for a LBT priority class and a default contention window size.

64. The apparatus of claim 61,
wherein the at least one indication of a contention window size to use for at least one LBT priority class is signaled in the uplink grant.

65. The apparatus of claim 54, further comprising:
means for detecting receipt of the uplink transmission;
means for failing to decode a cyclic redundancy check (CRC) for the uplink transmission; and
means for updating, based at least in part on failing to decode the CRC for the uplink transmission, a contention window size for a next LBT procedure to contend for access to the shared spectrum.

66. The apparatus of claim 54, wherein the uplink transmission comprises a multiple-transmission time interval (TTI) uplink transmission, the apparatus further comprising:
means for transmitting a multiple-TTI uplink grant for the multiple-TTI uplink transmission;
means for detecting receipt of the multiple-TTI uplink transmission during at least one TTI of the multiple-TTI uplink transmission; and
means for refraining from updating a contention window size for a next LBT procedure to contend for access to the shared spectrum based at least in part on detecting receipt of the multiple-TTI uplink transmission during the at least one TTI of the multiple-TTI uplink transmission.

67. The apparatus of claim 66, wherein the refraining from updating the contention window size for the next LBT procedure is further based at least in part on not detecting a LBT gap on the shared spectrum during the multiple TTIs of the multiple-TTI uplink transmission.

68. The apparatus of claim 54, further comprising:
means for transmitting an indication of a type of multi-carrier LBT procedure to perform for the uplink transmission.

69. The apparatus of claim 68, wherein the type of multi-carrier LBT procedure to perform comprises:
a type of LBT procedure performed for a UE-selected primary carrier in the shared spectrum, or a type of LBT procedure performed for a physical uplink control channel (PUCCH) carrier in the shared spectrum, or a type of LBT procedure performed for a UE-selected carrier in the shared spectrum, or a type of LBT procedure performed for a network access device-selected carrier in the shared spectrum, or a type of LBT procedure performed for multiple carriers in the shared spectrum.

70. The apparatus of claim 68, wherein the indication of the type of multi-carrier LBT procedure to perform is transmitted in radio resource control (RRC) signaling.

71. An apparatus for wireless communication at a network access device, comprising:
a processor; and
memory coupled to the processor, wherein the processor is configured to:
schedule an uplink transmission of a user equipment (UE) in a shared spectrum; and
transmit, over the air, in an uplink grant to the UE for the uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit in the uplink grant.

72. A non-transitory computer-readable medium for storing instructions executable by a processor of a network access device, comprising:
instructions to schedule an uplink transmission of a user equipment (UE) in a shared spectrum; and
instructions to transmit, over the air, in an uplink grant to the UE for the uplink transmission, information indicative of one of multiple types of Listen Before Talk (LBT) procedures, each of the multiple types of LBT procedures being associated with the uplink transmission, and wherein the information indicative of the one of multiple types of LBT procedures comprises at least one bit in the uplink grant.

73. A method for wireless communication, comprising:
determining an amount of queued traffic associated with each Listen Before Talk (LBT) priority class of a plurality of LBT priority classes;
selecting a first LBT priority class for performing a LBT procedure;
inverting a first amount of the queued traffic associated with the first LBT priority class with a second amount of the queued traffic associated with a second LBT priority class;
performing the LBT procedure based at least in part on the selected first LBT priority class to contend for access to a shared spectrum; and
transmitting, upon winning contention for access to the shared spectrum, at least some of the second amount of the queued traffic, wherein the first LBT priority class is a lower priority class than the second LBT priority class.

74. An apparatus for wireless communication, comprising:
means for determining an amount of queued traffic associated with each Listen Before Talk (LBT) priority class of a plurality of LBT priority classes;
means for selecting a first LBT priority class for performing a LBT procedure;
means for inverting a first amount of the queued traffic associated with the first LBT priority class with a second amount of the queued traffic associated with a second LBT priority class;
means for performing the LBT procedure based at least in part on the selected first LBT priority class to contend for access to a shared spectrum; and
means for transmitting, upon winning contention for access to the shared spectrum, at least some of the second amount of the queued traffic, wherein the first LBT priority class is a lower priority class than the second LBT priority class.

75. An apparatus for wireless communication, comprising:
a processor; and
memory coupled to the processor, wherein the processor is configured to:
determine an amount of queued traffic associated with each Listen Before Talk (LBT) priority class of a plurality of LBT priority classes;
select a first LBT priority class for performing a LBT procedure;
invert a first amount of the queued traffic associated with the first LBT priority class with a second amount of the queued traffic associated with a second LBT priority class;
perform the LBT procedure based at least in part on the selected first LBT priority class to contend for access to a shared spectrum; and
transmit, upon winning contention for access to the shared spectrum, at least some of the second amount of the queued traffic, wherein the first LBT priority class is a lower priority class than the second LBT priority class.

76. A non-transitory computer-readable medium for storing instructions executable by a processor, comprising:
  instructions to determine an amount of queued traffic associated with each Listen Before Talk (LBT) priority class of a plurality of LBT priority classes;
  instructions to select a first LBT priority class for performing a LBT procedure;
  instructions to invert a first amount of the queued traffic associated with the first LBT priority class with a second amount of the queued traffic associated with a second LBT priority class;
  instructions to perform the LBT procedure based at least in part on the selected first LBT priority class to contend for access to a shared spectrum; and
  instructions to transmit, upon winning contention for access to the shared spectrum, at least some of the second amount of the queued traffic, wherein the first LBT priority class is a lower priority class than the second LBT priority class.

* * * * *